US007403508B1

(12) United States Patent
Miao

(10) Patent No.: US 7,403,508 B1
(45) Date of Patent: Jul. 22, 2008

(54) MULTIBAND MIMO-BASED W-CDMA AND UWB COMMUNICATIONS

(76) Inventor: George J. Miao, 2 Inverness Dr., Marlboro, NJ (US) 07746

(*) Notice: Subject to any disclaimer, the term of this patent is extended or adjusted under 35 U.S.C. 154(b) by 1075 days.

(21) Appl. No.: 10/667,039

(22) Filed: Sep. 22, 2003

(51) Int. Cl.
*H04B 7/216* (2006.01)
*H04M 1/00* (2006.01)

(52) U.S. Cl. .................... 370/335; 370/342; 455/562.1; 455/575.7

(58) Field of Classification Search ................ 370/334, 370/335, 342; 455/552.1, 553.1, 562.1, 575.7, 455/101, 102, 103, 132
See application file for complete search history.

(56) References Cited

U.S. PATENT DOCUMENTS

| | | | | |
|---|---|---|---|---|
| 6,002,925 A | * | 12/1999 | Vu et al. | ...................... 455/313 |
| 6,195,400 B1 | * | 2/2001 | Maeda | ........................ 375/327 |
| 6,243,428 B1 | * | 6/2001 | Bottomley et al. | ........... 375/316 |
| 6,351,236 B1 | * | 2/2002 | Hasler | .................... 342/357.09 |
| 6,405,052 B1 | * | 6/2002 | Faber | ......................... 455/522 |
| 6,470,055 B1 | * | 10/2002 | Feher | ......................... 375/259 |
| 6,584,542 B1 | * | 6/2003 | Weigand | ..................... 711/104 |
| 6,813,485 B2 | * | 11/2004 | Sorrells et al. | .............. 455/313 |
| 6,862,271 B2 | * | 3/2005 | Medvedev et al. | .......... 370/329 |
| 2001/0044313 A1 | * | 11/2001 | Abrishamkar | ............... 455/458 |
| 2002/0102987 A1 | * | 8/2002 | Souisse et al. | .............. 455/454 |
| 2004/0189410 A1 | * | 9/2004 | Franca-Neto | ......... 331/107 SL |
| 2005/0053170 A1 | * | 3/2005 | Catreux et al. | .............. 375/267 |

* cited by examiner

*Primary Examiner*—Seema S. Rao
*Assistant Examiner*—Christine Duong

(57) ABSTRACT

This invention presents a system of a multiband MIMO-based W-CDMA and UWB communications for wireless and local area wireless communications. The system includes a W-CDMA base station, an UWB base station, and p-user dual-mode W-CDMA and UWB portable stations. This system allows p-user to transmit and receive a very high-speed multimedia information data based on W-CDMA and UWB communications to access both wireless phones and Internet.

17 Claims, 22 Drawing Sheets

MULTIBAND MIMO-BASED W-CDMA AND UWB COMMUNICATIONS

BACKGROUND

This invention is generally relative to a multiband Multiple-Input-Multiple-Output (MIMO)-based Wideband Code Division Multiple Access (W-CDMA) and Ultra Wideband (UWB) Communications for wireless and/or local-area wireless communications.

A MIMO is a multiple-input-multiple-output as a wireless link and is also a space-time signal processing. In the space-time signal processing a natural dimensional of transmitting data is complemented with a spatial dimension inherent in the use of multiple spatially distributed antennas. Thus this leads that the MIMO is able to turn multipath propagation into benefit for a user. In a MIMO system, signals on the transmit antennas and the receiver antennas are integrated in such a way that a quality of bit error rate (BER) or a data rate of the communication for each user or a transmitting distance is improved, thereby increasing a communication network's quality of service.

The next-generation wireless communication is defined to allow a subscriber to access World Wide Web or to perform file transferring over packet data connections capable of providing 144 kbps and 384 kbps for a mobility, and 2 Mbps in an indoor environment. The W-CDMA is a wideband, spread spectrum radio interface that uses CDMA technology to meet the needs for the next-generation wireless communication. The W-CDMA (also known as CDMA2000) supports for a wide range of radio frequency (RF) channel bandwidths from 1.25 MHz to 15 MHz operating at 1.90 GHz band, where the channel sizes of 1, 3, 6, 9, and 12×1.25 MHz. A wide channel of the W-CDMA offers any combination of higher data rates, thereby enhancing total capacity. The W-CDMA also employs a single carrier and a multicarrier system, which can be deployed as an overlay over one or more existing the second generation of TIA/EIA-95B1.25 MHz channels. In a multicarrier system, modulation symbols are de-multiplexed onto N separate 1.25 MHz carriers. Each carrier is spread with a 1.2288 Mcps chip rate.

With regard to the UWB communications, U.S. Federal Communications Commission (FCC) released a revision of Part 15 of Commission's rules for UWB transmission systems on Apr. 22, 2002. FCC permitted the marketing and operation of certain types of new products, incorporating UWB technology. Thus, UWB communication devices can operate using spectrum occupied by existing radio service without causing interference. This results permitting scarce spectrum resources to be used more efficiently. The UWB communication devices can offer significant benefits for Government, public safety, businesses and consumers under an unlicensed basis of an operation spectrum.

FCC is adapting unwanted emission limits for the UWB communication devices that are significantly more stringent than those imposed on other Part 15 devices. For an indoor UWB operation, FCC provides a wide variety of the UWB communication devices, such as high-speed home and business networking devices under the Part 15 of the Commission's rules subject to certain frequency and power limitations. However, the UWB communication devices must operate in the frequency band ranges from 3.1 GHz to 10.6 GHz, and have an emission of −10 dBm for the indoor UWB operation. In addition, the UWB communication devices should also satisfy the Part 15.209 limit for the frequency band below 960 MHz. Table 1 lists the FCC restriction of the emission masks (dBm) along with the frequencies (GHz) for the UWB communication devices in an indoor environment.

TABLE 1

| Frequency (MHz) | EIRP (dBm) |
|---|---|
| 0-960 | −41.3 |
| 960-1610 | −75.3 |
| 1610-1990 | −53.3 |
| 1990-3100 | −51.3 |
| 3100-10600 | −41.3 |
| Above 10600 | −51.3 |

The UWB communication devices are defined as any devices where a fractional bandwidth (FB) is greater than 0.25 based on the following formula:

$$FB = 2\left(\frac{f_H - f_L}{f_H + f_L}\right), \quad (1)$$

where $f_H$ is the upper frequency of −10 dBm emission point, and $f_L$ is the lower frequency of −10 dBm emission point. A center transmission frequency $F_c$ of the UWB communication devices is defined as an average of the upper and lower −10 dBm emission points as follows:

$$F_C = \frac{f_H + f_L}{2}. \quad (2)$$

Furthermore, a minimum frequency bandwidth of 500 MHz must be used for indoor UWB communication devices regardless of the center frequency.

The UWB communication devices can be designed to use for wireless broadband communications within a short-distance range, particularly for a very high-speed data transmission suitable for broadband access to networks in the indoor environment.

A multiband MIMO-based W-CDMA and UWB communication transceiver system is disclosed herein according to some embodiments of the present invention. The invention system includes a W-CDMA base station, a UWB base station, and P-user dual-mode portable stations of W-CDMA and UWB communication devices. The W-CDMA base station has a multicarrier for 12 channels with a total of 15 MHz frequency bandwidth at the center of 1.9 GHz frequency band, and employs four antennas at the transmitter and receiver. The UWB communication base station uses a multicarrier for four frequency bands (referred to as a multiband) with a total of 2.048-GHz frequency bandwidth in the frequency range from 3.1 GHz to 5.15 GHz, and also employs four antennas at the transmitter and receiver. Each of the frequency bands in the UWB communications has a 512-MHz frequency bandwidth, using an Orthogonal Frequency Division Multiplexing (OFDM) modulation. On the other hand, each of the P-user dual-mode portable stations of the W-CDMA and UWB communication devices uses two antennas, and shares some of common components, such as analog-to-digital (A/D) and digital-to-analog (D/A) converters, memory, etc. The W-CDMA in the dual-mode portable stations uses 12 channels with each channel of 1.25 MHz, has a multicarrier, and is able to transmit a data rate more than 2 Mcps, while the UWB employs four frequency band-based multicarrier OFDM with each frequency band of 512 MHz, and can transmit a data rate up to 1.5872 Gbps. In addition, all of the dual-mode portable station use a direct sequence spread spectrum (DSSS), which is a pseudorandom (PN) sequence to spread a user signal. The DSSS is used to separate signals coming from multiuser. Thus, multiple access interference (MAI) among multiuser can be avoided when a set of PN sequences is designed with as low cross-correlation as possible.

An OFDM is an orthogonal multicarrier modulation technique that has its capability of multifold increasing symbol duration. Increasing the number of subcarriers in the OFDM modulation, the frequency selectivity of a channel may be reduced so that each subcarrier experiences flat fading for the UWB communications. Thus, an OFDM approach is a particular useful for the UWB communications over a short-range fading channel.

The present invention of the multiband MIMO-based W-CDMA and UWB communications utilizes both benefits of W-CDMA wireless phones and UWB wireless broadband communications. Such a dual-mode device not only can transmit the packet data in a form of wireless phone but also can use as a very-high speed wireless broadband Internet device to transmit and receive data, image, video, video game, music, and stock graph, etc., in a real-time. Thus, there is a continuing need of the multiband MIMO-based W-CDMA and UWB communication transceiver system for delivering a very-high data rate with a capability of flexibility and scalability in a combination form of the wireless and fixed wireless environment.

SUMMARY

In accordance with one aspect, a multiband MIMO-based dual-mode portable station of W-CDMA and UWB communication receiver comprises a MIMO-based dual-mode W-CDMA and UWB filtering and multicarrier Radio Frequency (RF) section, a W-CDMA baseband processor, an UWB OFDM multiband baseband processor, a W-CDMA and UWB OFDM multiband control processor, and a multiple antenna unit.

Other aspects are set forth in the accompanying detailed description and claims.

DETAILED DESCRIPTION

Some embodiments described herein are directed to the multiband MIMO-based W-CDMA and UWB transceiver system for wireless and fixed wireless communications. Such a dual-mode transceiver system can be implemented in hardware, such as in an Application Specific Integrated Circuits (ASIC), digital signal processor, field programmable gate array (FPGA), software, or a combination of hardware and software.

Multiuser MIMO-Based 3G W-CDMA and UWB System

Figure 1:
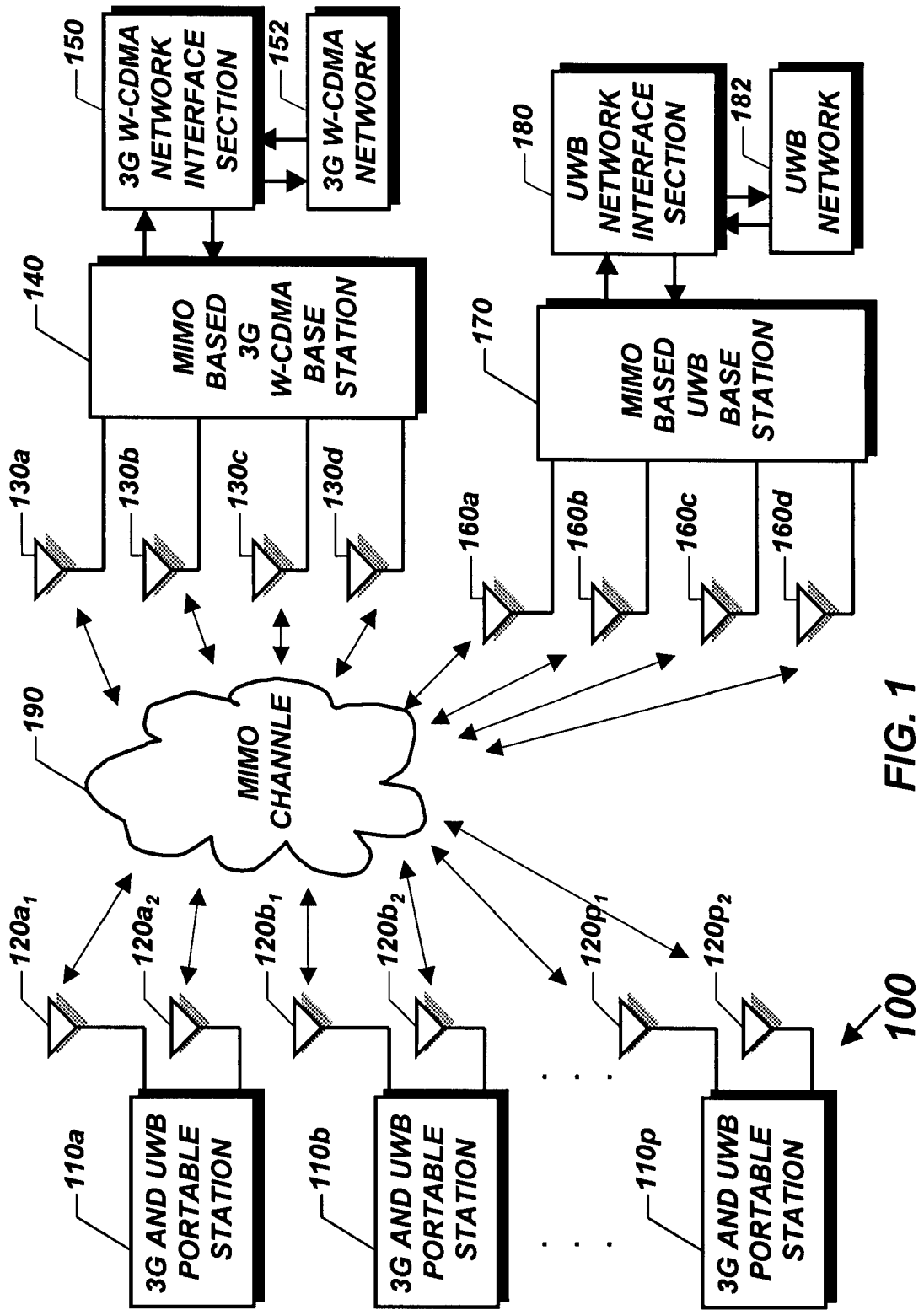
FIG. 1 is a block diagram of shewing a multiband MIMO-based W-CDMA and UWB communication transceiver system including P-user dual-mode portable stations of W-CDMA and UWB, and two different base stations of the W-CDMA and UWB communication according to some embodiments.

A multiuser MIMO-based W-CDMA and UWB system 100 for the wireless and fixed wireless communications is shown in FIG. 1 in accordance with one embodiment of the present invention. Dual-mode W-CDMA and UWB portable stations from 110$a$ to 110$p$ can simultaneously communicate with either a MIMO-based W-CDMA base station 140 or a MIMO-based UWB base station 170 to transmit and receive information data. The dual-mode W-CDMA and UWB portable station 110$a$ transmits and receives the W-CDMA or the UWB information data through its two antennas of 120$a_1$ and $120a_2$. The base station of the W-CDMA 140 or the UWB base station 170 communicates with the dual-mode W-CDMA and UWB portable station $110a$ through the W-CDMA's four antennas from $130a$ to $130d$ or through the UWB's four antennas from $160a$ to $160d$, respectively. In a similar way, other dual-mode W-CDMA and UWB portable stations from $110b$ to $110p$ also transmit and receive the information data through their antennas from $120b_1$ and $120b_2$ to $120p_1$ and $120p_2$, respectively, and communicate with either the W-CDMA base station 140 through the antennas from $130a$ to $130d$ or the UWB base station 170 through the antennas from $160a$ to $160d$. The W-CDMA base station 140 is coupled to a W-CDMA network interface section 150, which is connected with a W-CDMA network 152. The UWB base station 170 is connected with an UWB network interface section 180 that is coupled to an UWB network 182.

The MIMO-based W-CDMA base station 140 can transmit multiuser's information data at the same time. After scrambling with a long code corresponding to user p, the user data is de-multiplexed onto N carriers, where N equals to 3, 6, 9, or 12. On each carrier, the demultiplexed bits are mapped onto I and Q followed by using Walsh spreading. For reverse closed loop power control, power control bits may be punctured onto the forward link channel at a rate of 800 Hz. Then, a signal on each carrier is orthogonally spread by an appropriate Walsh code function in such a way that a fixed chip rate of 1.2288 Mcps can be maintained per carrier. Walsh codes may differ on each carrier. The signal on each carrier is then complex PN spread followed by using a baseband filtering and binary phase-shifted keying (BPSK) or quaternary phase-shifted keying (QPSK) modulation. The W-CDMA base station 140 can transmit and receive the data rate from 144 kbps to greater than 2 Mbps and supports a wide range of RF channel bandwidths, including 1.25 MHz, 3.75 MHz, 7.5 MHz, 11.25 MHz, and 15 MHz.

The MIMO-based UWB base station 170, knowing all of the UWB PN sequences of the dual-mode W-CDMA and UWB portable stations from $110a$ to $110p$, can transmit and receive all of the UWB information data from all of the dual-mode W-CDMA and UWB portable stations from $110a$ to $110p$ by spreading and despreading of the user PN sequences on the multiband. The MIMO-based UWB base station 170 uses a BPSK or a QPSK modulation and a carrier for each of the multiband to transmit and receive the information data rate of 396.8 Mbps on one frequency band. As a result, the MIMO-based UWB base station 170 can simultaneously transmit and/or receive the maximum data rate up to 1.5872 Gbps by using all of the four frequency bands. In addition, the UWB base station 170 is able to transmit the data rate with an enhancement of a longer range due to use the multiple antennas.

3G W-CDMA Base Station Transmitter Architecture

Figure 2:
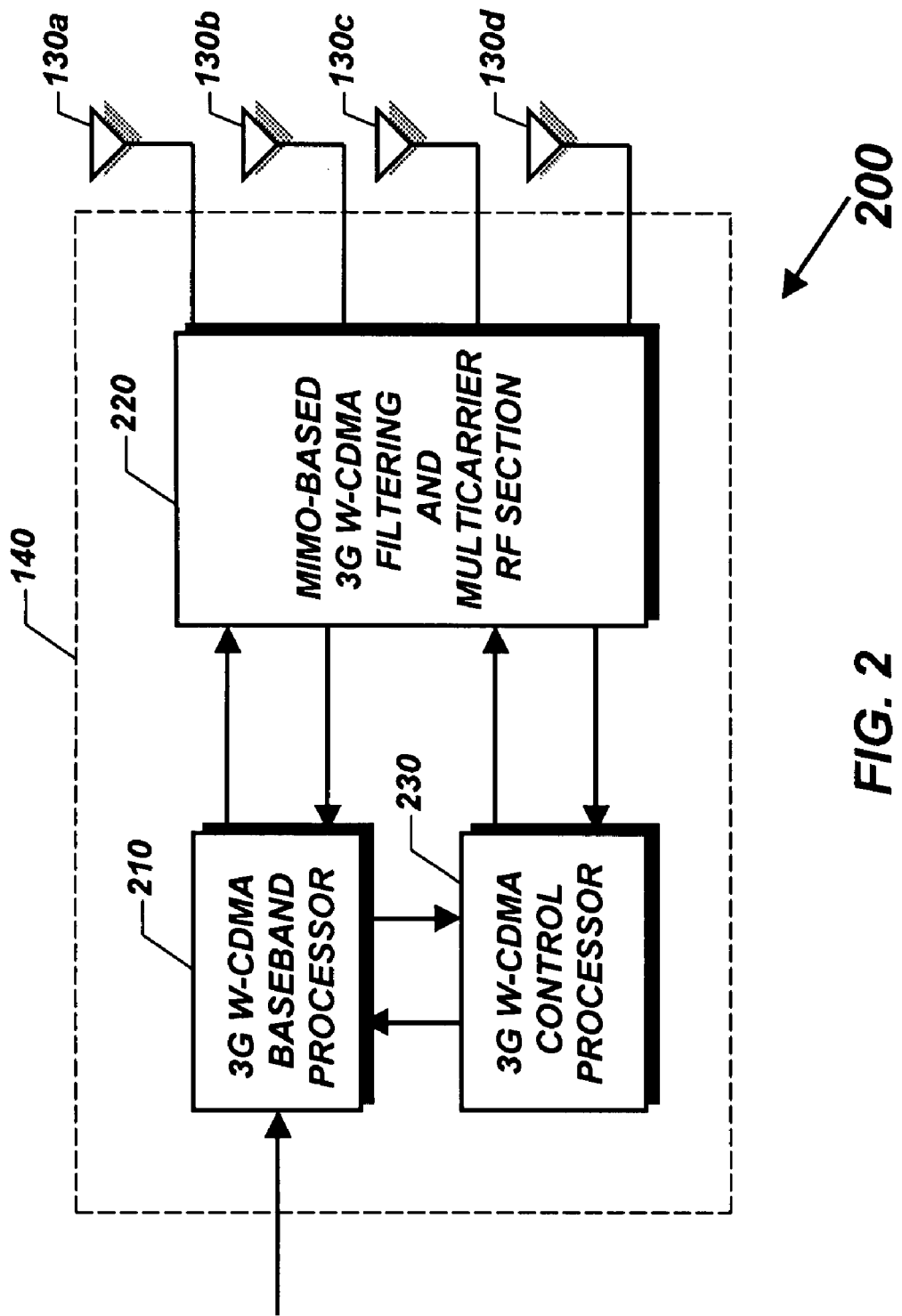
FIG. 2 is a block diagram of a MIMO-based W-CDMA base station employing four antennas according to some embodiments.

FIG. 2 is a block diagram 200 of the MIMO-based W-CDMA base station 140 according to some embodiments. The MIMO-based W-CDMA base station 140 includes a W-CDMA baseband processor 210, a MIMO-based W-CDMA filtering and multicarrier RF section 220 coupled to four antennas from $130a$ to $130d$, and a W-CDMA control processor 230. The W-CDMA baseband processor 210 deals with a multiuser digital signal processing of a physical layer including turbo or convolution encoder and decoder, block interleaver and deinterleaver, spreading and dispreading. The MIMO-based W-CDMA filtering and multicarrier RF section 220 provides filtering, modulation, and transmits W-CDMA signal through the antennas from $130a$ to $130d$. The W-CDMA control processor 230 supports a data frame information, and controls the W-CDMA baseband processor 210 and the MIMO-based W-CDMA filtering and multicarrier RF section 220.

The MIMO-based W-CDMA base station 140 is able to transmit and receive multiuser information data through multichannel with multicarrier simultaneously. There are a total of 12 multicarriers for a wide range of RF channel bandwidths of 1.25 MHz, 3.75 MHz, 7.5 MHz, 11.25 MHz, and 15 MHz. The signal on each carrier is orthogonally spread by the appropriate Walsh code at the chip rate of 1.2288 Mcps. Then, the signal on each carrier is filtered and modulated by using the baseband filtering and BPSK or QPSK modulation. The MIMO-based W-CDMA base station 140 can transmit and/or receive the data rate from 144 kbps to more than 2 Mbps.

Figure 3:
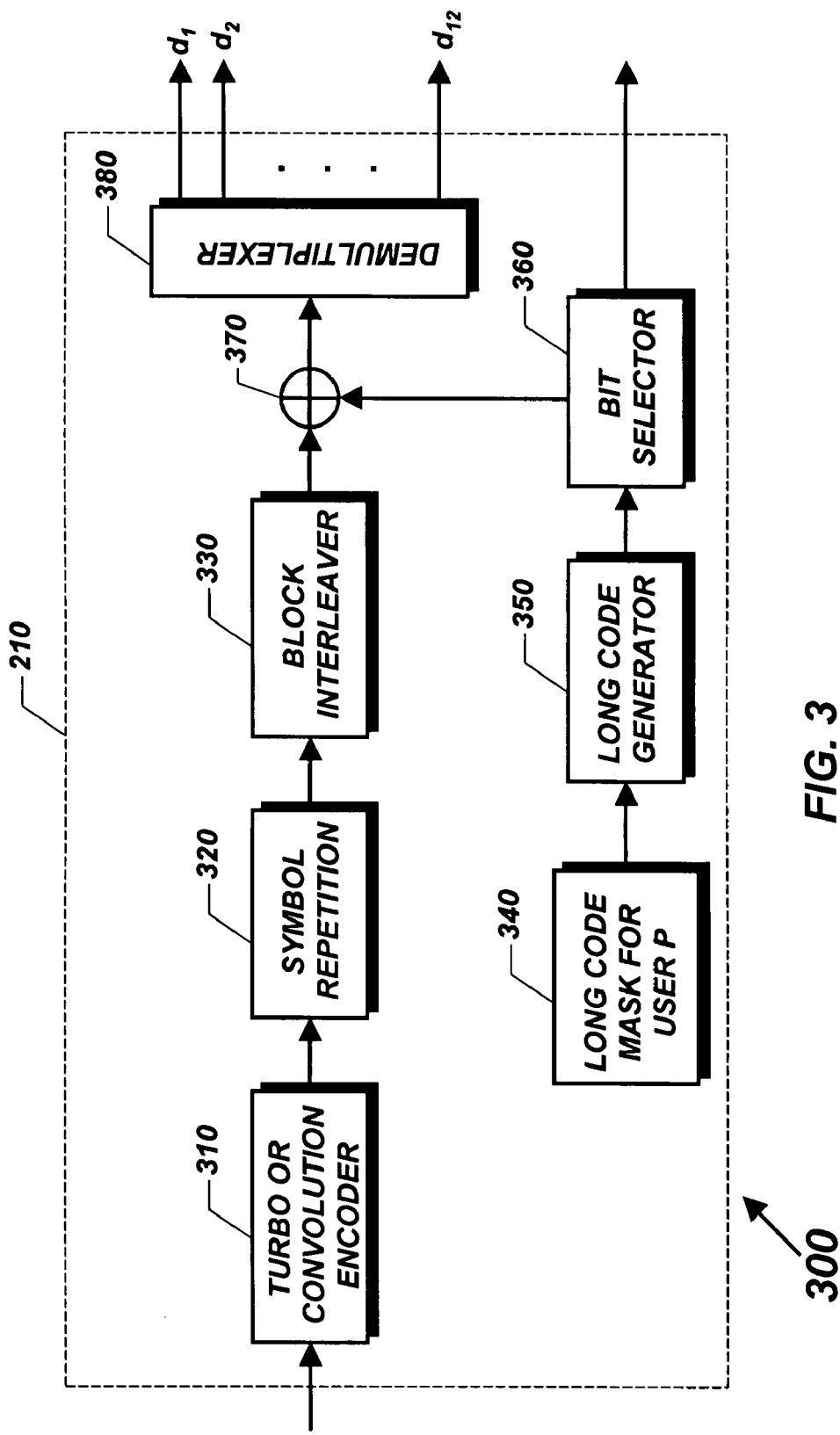
FIG. 3 is a detailed block diagram of a W-CDMA baseband processor of the base station according to some embodiments.

Referring to FIG. 3 is a detailed block diagram 300 of the W-CDMA baseband processor 210 according to some embodiments. A turbo or convolution encoder 310 that is used to encode the user information data is coupled to a symbol repetition 320. The symbol repetition 320 can repeat a frame symbol data with 2-time, 4-time or 8-time. The output of the symbol repetition 320 is interleaved by using a block interleaver 330. The output data of the block interleaver 330 is scrambled with a long code from a bit selector 360 by using an exclusive OR (XOR) 370. A long code mask for user p 340 is coupled to a long code generator 350 that is connected with a bit selector 360. The scrambled data of the XOR 370 output is demultiplexed onto 12 parallel data labeled from $d_1$ to $d_{12}$ by using a demultiplexer 380.

Figure 4:
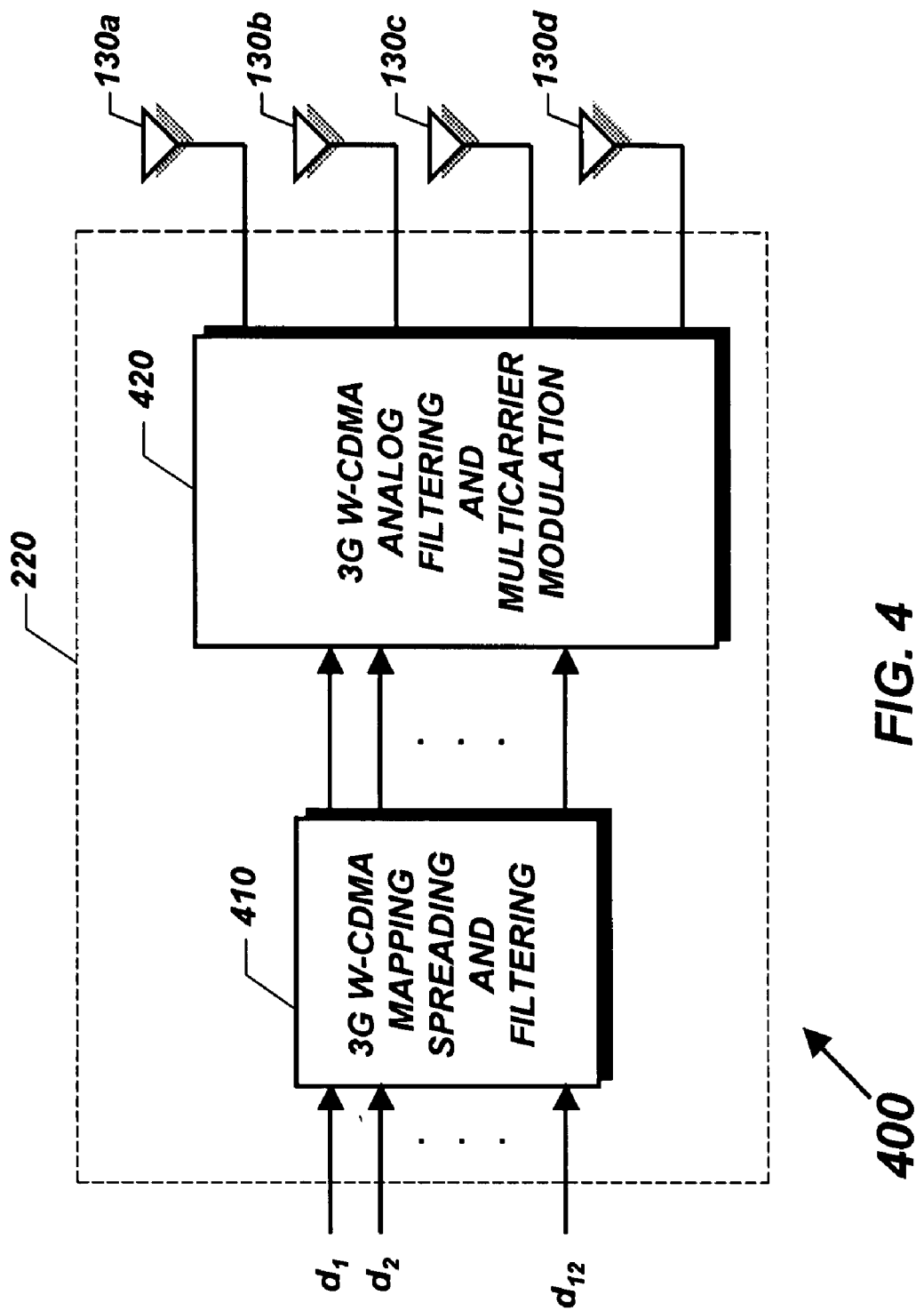
FIG. 4 is a detailed block of a MIMO-based W-CDMA filtering and multicarrier RF section according to some embodiments.

FIG. 4 is a block diagram 400 of the MIMO-based W-CDMA filtering and multicarrier RF section 220 according to some embodiments. The MIMO-based 3G W-CDMA filtering and multicarrier RF section 220 includes a W-CDMA mapping spreading and filtering 410 and a W-CDMA analog filtering and multicarrier modulation 420. The W-CDMA mapping spreading and filtering 410 is coupled to the W-CDMA analog filtering and multicarrier modulation 420. The 12 parallel signals from $d_1$ to $d_{12}$ are passed through the W-CDMA mapping spreading and filtering 410 to produce 12 parallel output signals, which are used as the input signals for the W-CDMA analog filtering and multicarrier modulation 420. Then the W-CDMA analog filtering and multicarrier modulation 420 produces four parallel signals for the transmitter through four antennas from $130a$ to $130d$.

Figure 5:
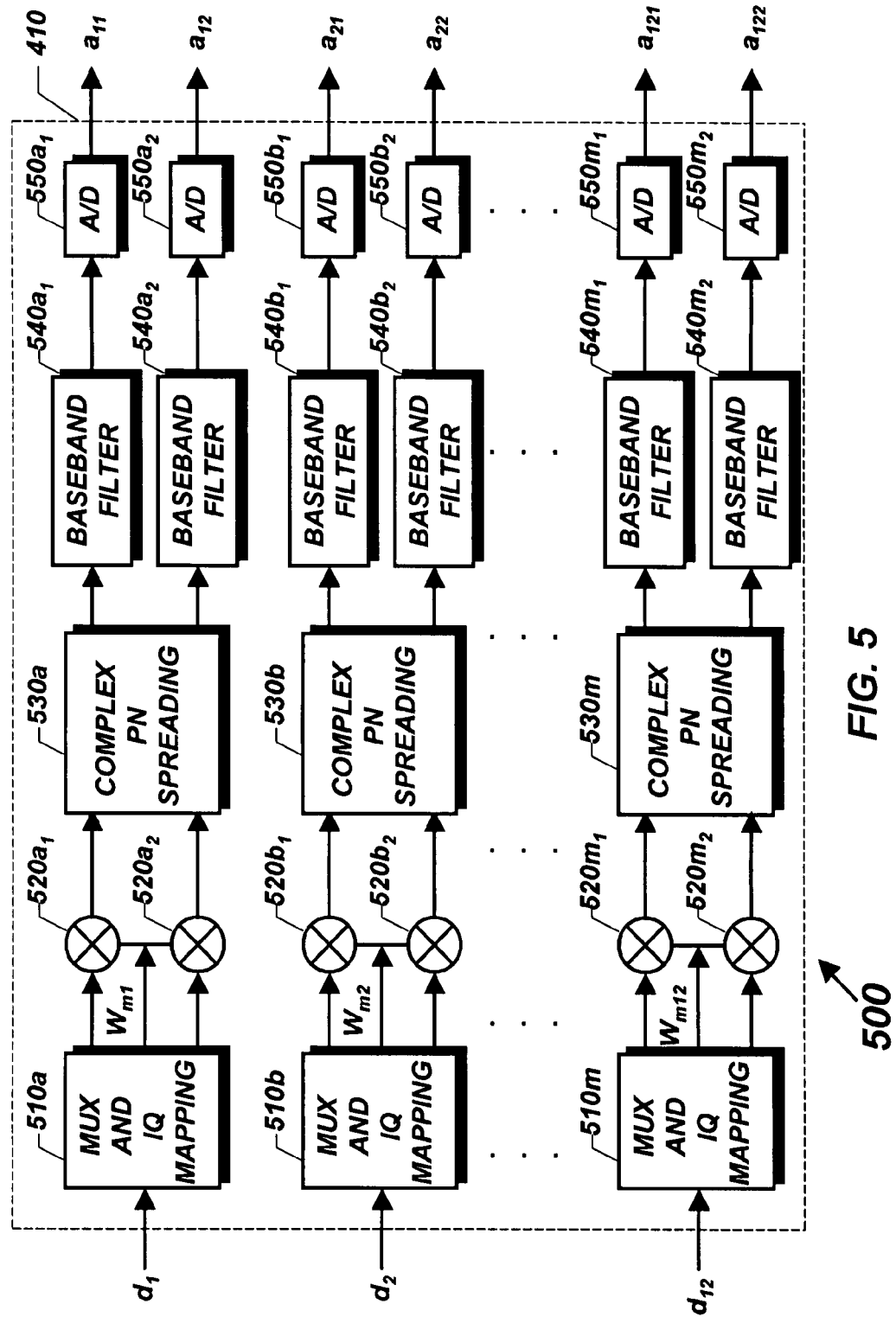
FIG. 5 is a detailed block diagram of a W-CDMA mapping, spreading, and filtering section according to some embodiments.

Referring to FIG. 5 is a detailed block diagram 500 of the W-CDMA mapping, spreading and filtering 410 according to some embodiments. The 12 parallel input signals from $d_1$ to $d_{12}$ are passed through 12 MUX and IQ mapping units from $510a$ to $510m$. The output I and Q signals of the MUX and IQ mapping units from $510a$ to $510m$ are spread by using Walsh codes from $W_{m1}$ to $W_{m12}$, respectively. Then signals are complex PN spread by using complex PN spreading units from $530a$ to $530m$, followed by baseband filters from $540a_1$ and $540a_2$ to $540m_1$ and $540m_2$. Analog-to-digital (A/D) converter units from $550a_1$ and $550a_2$ to $550m_1$ to $550m_2$ convert all of the digital signals of the baseband filter outputs from $540a_1$ and $540a_2$ to $540m_1$ and $540m_2$ into parallel analog signals from $a_{11}$ and $a_{12}$ to $a_{121}$ and $a_{122}$.

Figure 6:
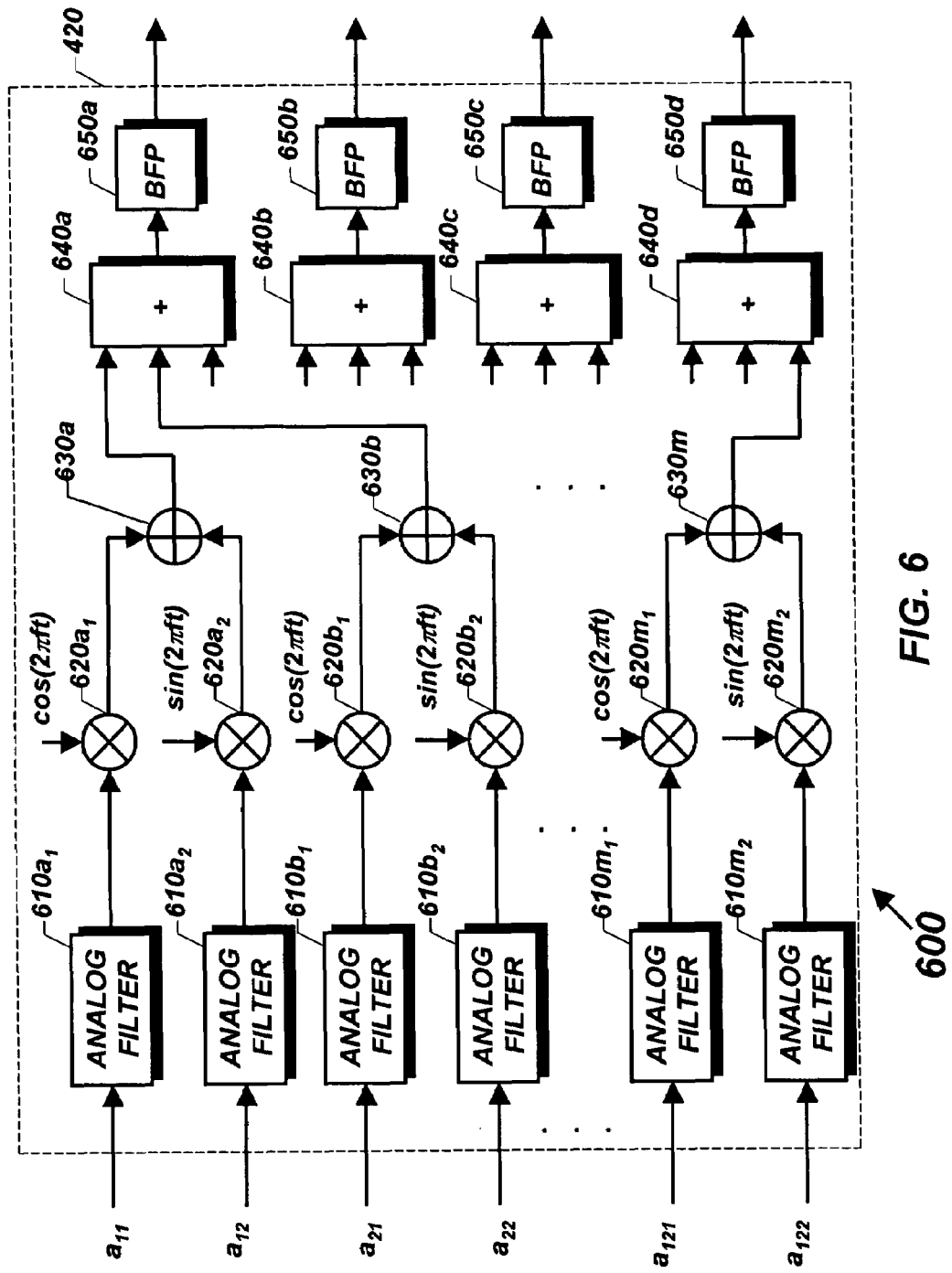
FIG. 6 is a detailed block diagram of a W-CDMA analog filtering and multicarrier modulation section according to some embodiments.

Referring to FIG. 6 is a detailed block diagram 600 of the W-CDMA analog filtering and multicarrier modulation 420 according to some embodiments. The input signals from $a_{11}$ and $a_{12}$ to $a_{121}$ and $a_{122}$ are in parallel passed through analog filters from $610a_1$ and $610a_2$ to $610m_1$ and $610m_2$ to produce reconstructed analog signals. Each pair of the output signals of the analog filters from $610a_1$ and $610a_2$ to $610m_1$ and $610m_2$ is performed QPSK modulation with multicarrier by using each pair of multipliers $620a_1$ and $620a_2$ and one addition 630$a_1$ to multipliers 620$m_1$ and 620$m_2$ and one addition 630$m$, respectively. The 12 QPSK signals with multicarriers are grouped together into four signals by using four additions from 640$a$ to 640$d$, respectively, followed by four baseband filters (BPF) from 650$a$ to 650$d$ to produce signals for power amplifier and antennas.

Figure 7:
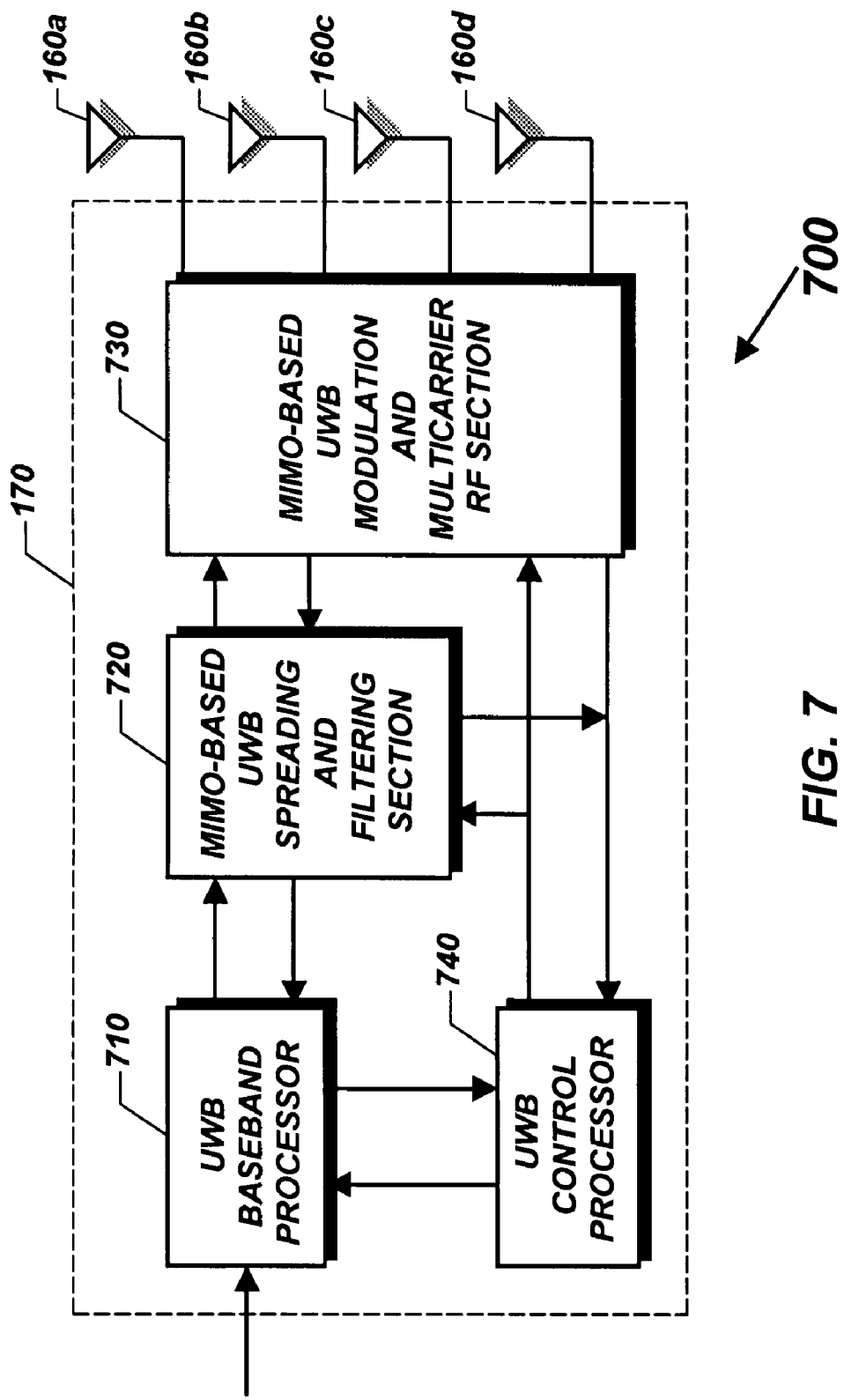
FIG. 7 is a block diagram of a MIMO-based UWB base station according to some embodiments.

FIG. 7 is a block diagram 700 of the MIMO-based UWB base station 170 according to some embodiments. An UWB baseband processor 710, which performs convolution encoder and decoder, interleaver and deinterleaver, and inverse fast Fourier transform (IFFT) and fast Fourier transform (FFT) functions, is coupled to a MIMO-based UWB spreading and filtering 720, followed by a MIMO-based UWB modulation and multicarrier RF section 730. The MIMO-based UWB modulation and multicarrier RF section 730 is connected with four antennas from 160$a$ to 160$d$. An UWB control processor 740 is used to control a frame information and entire process among the units of the MIMO-based UWB base station 170, the MIMO-based UWB spreading and filtering 720, and MIMO-based UWB modulation and multicarrier RF section 730.

Figure 8:
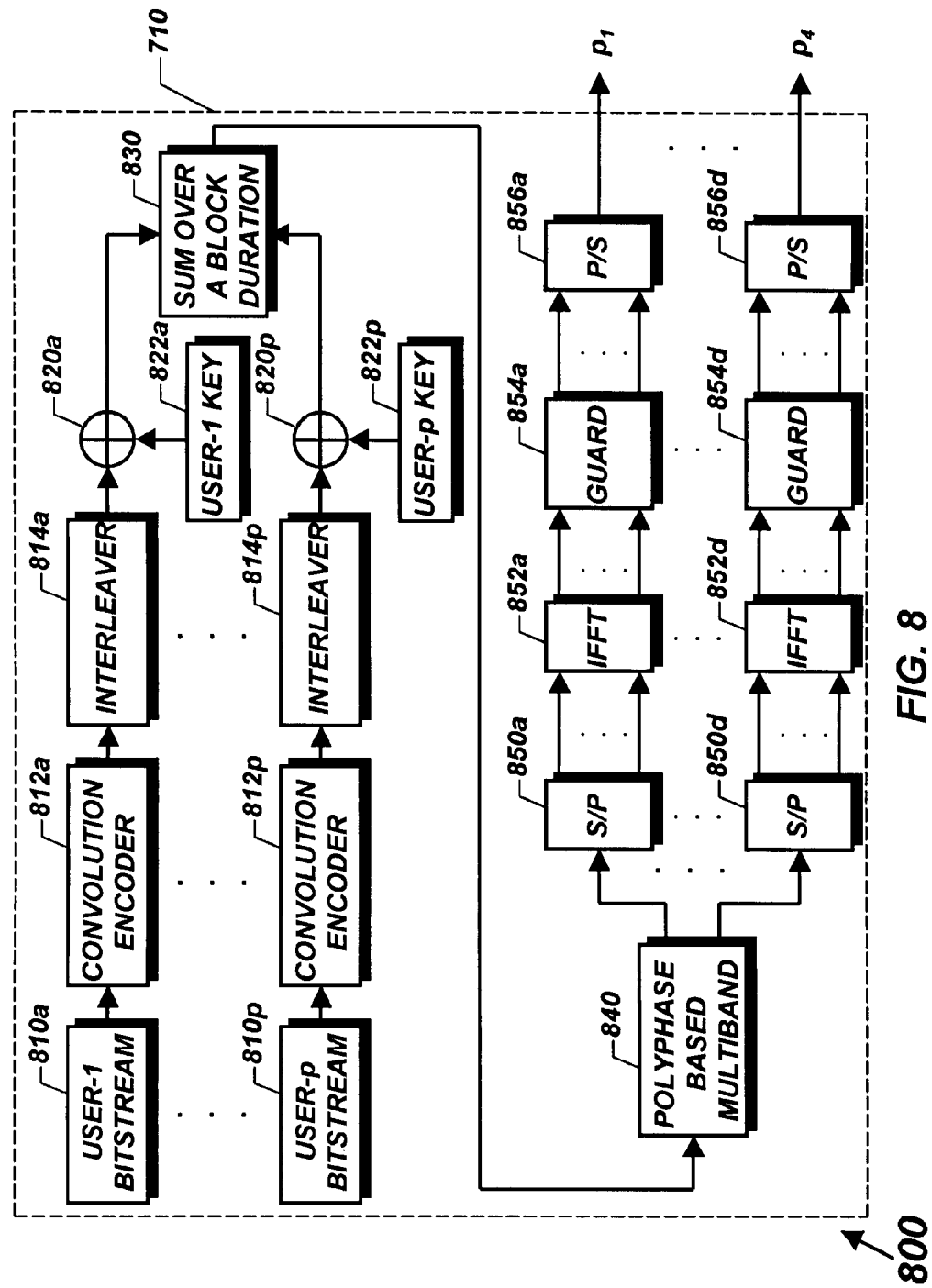
FIG. 8 is a detailed block diagram of an UWB base station according to some embodiments.

Referring to FIG. 8 is a detailed block diagram 800 of the UWB baseband processor 710 according to some embodiments. There are a number of p users from a user-1 bitstream 810$a$ to a users bitstream 810$p$, respectively. The user-1 bitstream 810$a$ is coupled to a ½-rate convolution encoder 812$a$ that is connected to an interleaver 814$a$. Using a unique PN sequence of a user-1 key 822$a$ spreads the output sequence of the interleaver 814$a$. In a similar way, the user-p bitstream 810$p$ is coupled to the ½-rate convolution encoder 812$p$ that is connected to the interleaver 814$p$. Using the unique PN sequence of the user-p key 822$p$ spreads the output sequences of the interleaver 814$p$. All of the PN sequences of the user-1 key 822$a$ to the users key 822$p$ are orthogonal each other. This means that a cross-correlation between one PN sequence and other PN sequences is almost zero, while a self-correlation of a user PN sequence is almost equal to one. Then, the p output sequences from the interleaver 814$a$ to the interleaver 814$p$ in a parallel operation are added together to form a serial sequence output by using a sum over block duration 830. The serial output of the sum over block duration 830 is converted into four parallel sequences by using a polyphase-based multiband 840. Thus, the first of the output sequence from the polyphase-based multiband 840 is converted into a 512-parallel sequence by using a serial-to-parallel (S/P) 850$a$. The 512-parallel sequence is formed to a 512-parallel complex sequence with symmetric conjugates. The 512-parallel complex sequence is passed through an IFFT 852$a$ to produce a 1024-parallel real sequence. The IFFT 852$a$ is coupled to a guard 854$a$ to insert 256 samples as a guard interval for the output sequence of the IFFT 852$a$. As a result, the output of the guard 854$a$ is a 1280-parallel real sequence. Then, the outputs of the guard 854$a$ are used to form a serial signal $p_1$ by using a parallel-to-serial (P/S) 856$a$. In the same way, the fourth of the output sequence from the polyphase-based multiband 840 is converted into a 512-parallel sequence by using a S/P 850$k$. The 512-parallel sequence is formed to a 512-parallel complex sequence with symmetric conjugates. The 512-parallel complex sequence is passed through an IFFT 852$d$ to produce a 1024-parallel real sequence. The IFFT 852$d$ is coupled to a guard 854$d$ to insert 256 samples as a guard interval for the output sequence of the IFFT 852$d$. Thus, the output of the guard 854$d$ is a 1280-parallel real sequence. The guard interval is used to avoid an intersymbol interference (ISI) between IFFT frames. Finally, the outputs of the guard 854$d$ are used to form a serial signal $p_4$ by using a P/S 856$d$.

The data rate-dependent parameters of the 1024-point IFFT operation 852 is listed in Table 2 for each of the frequency bands as follows:

TABLE 2

| Four band frequency data rate (Gbits/s) | One frequency band data rate (Mbits/s) | Modulation | Coding rate | Coded bits per sub-carrier | Coded bits per OFDM symbol | Data bits per OFDM symbol |
|---|---|---|---|---|---|---|
| 0.7936 | 198.4 | BPSK | 1/2 | 1 | 992 | 496 |
| 1.5872 | 396.8 | QPSK | 1/2 | 2 | 1984 | 992 |

The corresponding 1024-point IFFT of detailed timing-related parameters for each of the frequency bands is listed in Table 3:

TABLE 3

| Parameters | Descriptions | Value |
|---|---|---|
| $N_{ds}$ | Number of data subcarriers | 992 |
| $N_{ps}$ | Number of pilot subcarriers | 8 |
| $N_{ts}$ | Number of total subcarriers | 1000 |
| $D_{fs}$ | Frequency spacing for subcarrier (512 MHz/1024) | 0.5 MHz |
| $T_{FFT}$ | IFFT/FFT period (1/$D_{fs}$) | 2.0 µs |
| $T_{gd}$ | Guard duration ($T_{FFT}$/4) | 0.5 µs |
| $T_{signal}$ | Duration of the signal BPSK-OFDM symbol ($T_{FFT}$ + $T_{gd}$) | 2.5 µs |
| $T_{sym}$ | Symbol interval ($T_{FFT}$ + $T_{gd}$) | 2.5 µs |
| $T_{short}$ | Short duration of training sequence (10 × $T_{FFT}$/4) | 5.0 µs |
| $T_{gd2}$ | Training symbol guard duration ($T_{FFT}$/2) | 1.0 µs |
| $T_{long}$ | Long duration of training sequence (2 × $T_{FFT}$ + $T_{gd2}$) | 5.0 µs |
| $T_{preamble}$ | Physical layer convergence procedure preamble duration ($T_{short}$ + $T_{long}$) | 10.0 µs |

Figure 9:
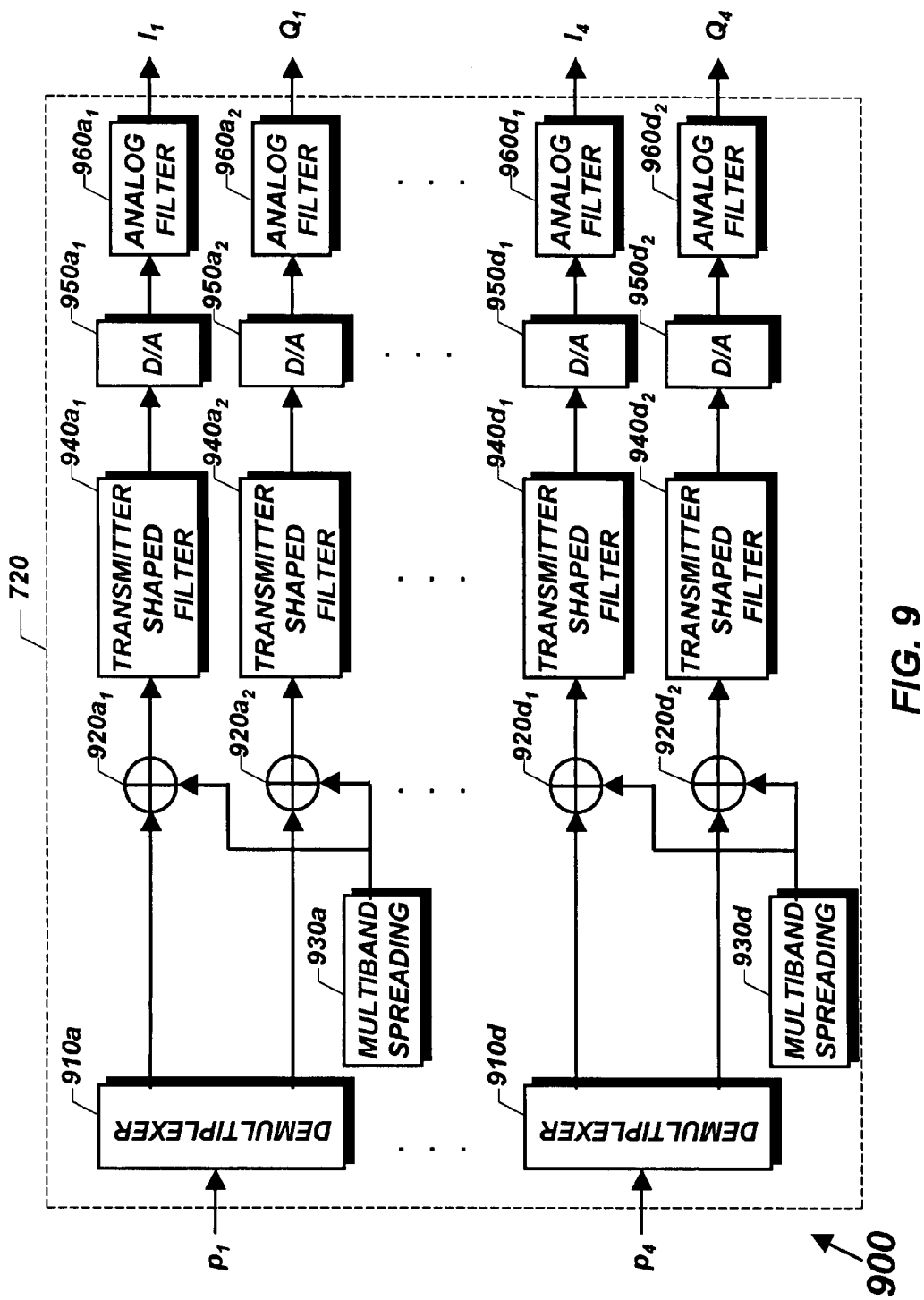
FIG. 9 is a detailed block diagram of a MIMO-based UWB spreading and filtering section according to some embodiments.

Referring to FIG. 9 is a detailed block diagram 900 of the MIMO-based spreading and filtering section 720 according to some embodiments. There are four input signals from $p_1$ to $P_4$. The input signal of $p_1$ is demultiplexed by using a demultiplexer 910$a$ to produce I and Q signals. The I and Q signals are spread with an output sequence of a multiband spreading 930$a$ by using XORs of 920$a$ and 920$b$ to produce spread I and Q signals, followed by two transmitter shaped filters of 940$a_1$ and 940$a_2$, respectively. Then, the output signals of the transmitter shaped filters of 940$a_1$ and 940$a_2$ are passed through two D/A converters of 950$a_1$ and 950$a_2$, followed by two analog filters of 960$a_1$ and 960$a_2$ to smooth the analog signals, respectively. In the same way, the input signal of $p_4$ is demultiplexed by using a demultiplexer 910$d$ to produce I and Q signals. The I and Q signals are spread with an output sequence of a multiband spreading 930$d$ by using XORs 920$d_1$ and 920$d_2$ to produce spread I and Q signals, followed by two transmitter shaped filters of 940$d_1$ and 940$d_2$, respectively. Then, the output signals of the transmitter shaped filters of $940d_1$ and $940d_2$ are passed through two D/A converters of $950d_1$ and $950d_2$, followed by two analog filters of $960d_1$ and $960d_2$ to smooth the analog signals, respectively. Thus, the MIMO-based spreading and filtering section of 720 converts four digital sequences onto four I and four Q spread analog signals with multicarrier for transmitter section.

Figure 10:
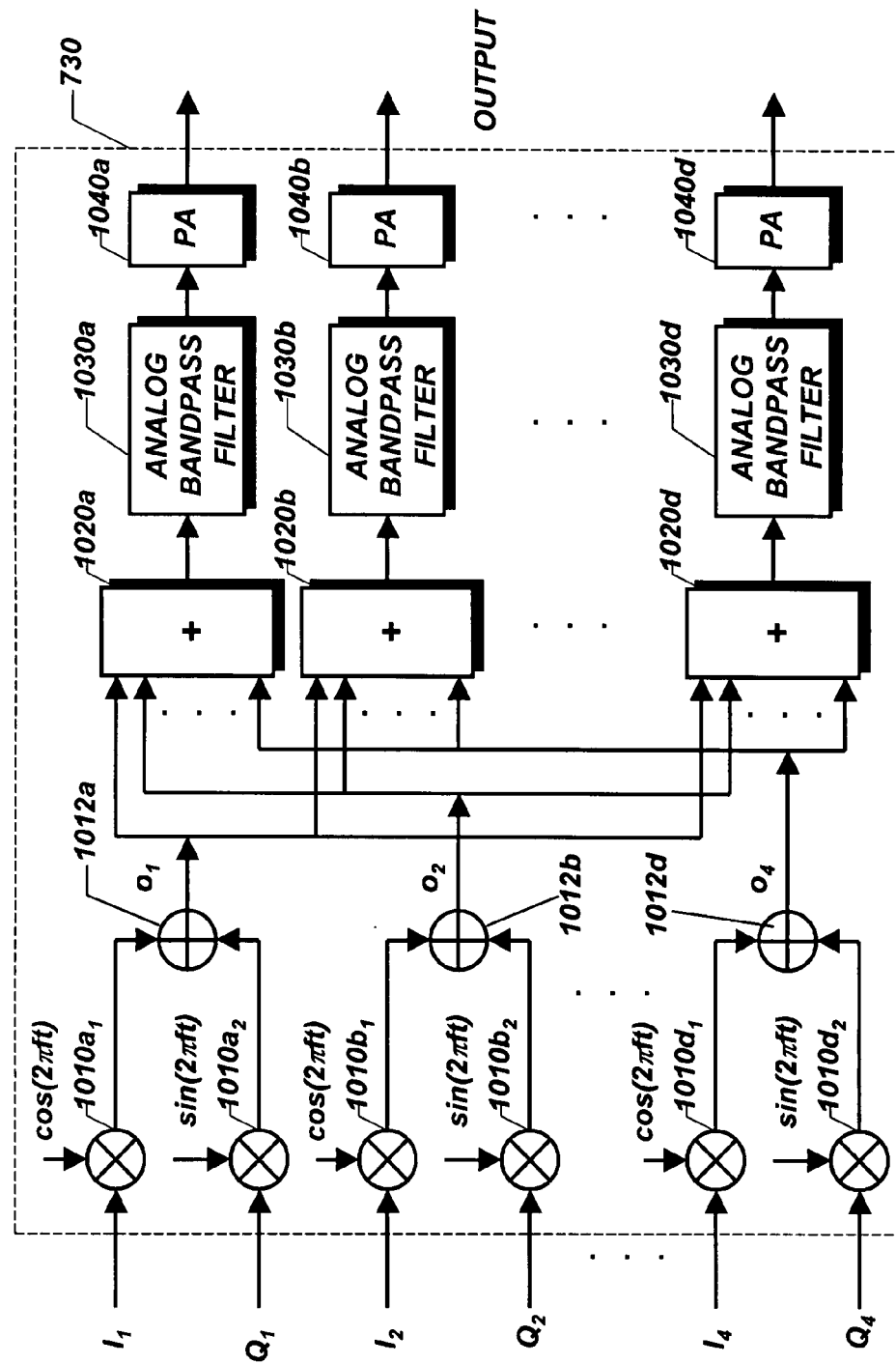
FIG. 10 is a detailed block diagram of a MIMO-based UWB modulation and multicarrier RF section according to some embodiments.

Referring to FIG. 10 is a detailed block diagram 1000 of the MIMO-based UWB modulation and multicarrier RF section 730 according to some embodiments. The input signals from $I_1$ and $Q_1$ to $I_4$ and $Q_4$ are modulated in a QPSK format with multicarriers by using multipliers of $1010a_1$ and $1010a_2$ and an addition from 1012a to $1010d_1$ and $1101d_2$ and an addition 1012d to produce RF signals from $o_1$ to $o_2$. Then, the signals from $o_1$ to $o_2$ are summed together to form four RF signals with multicarriers by using additions from 1020a to 1020d, followed by using analog bandpass filters from 1030a to 1030d. The output RF signals of the analog bandpass filters from 1030a to 1030d are passed through the power amplifier (PA) from 1040a to 1040d onto antennas.

Spectrums of MIMO-Based UWB Base Station Transmitter

Figure 11:
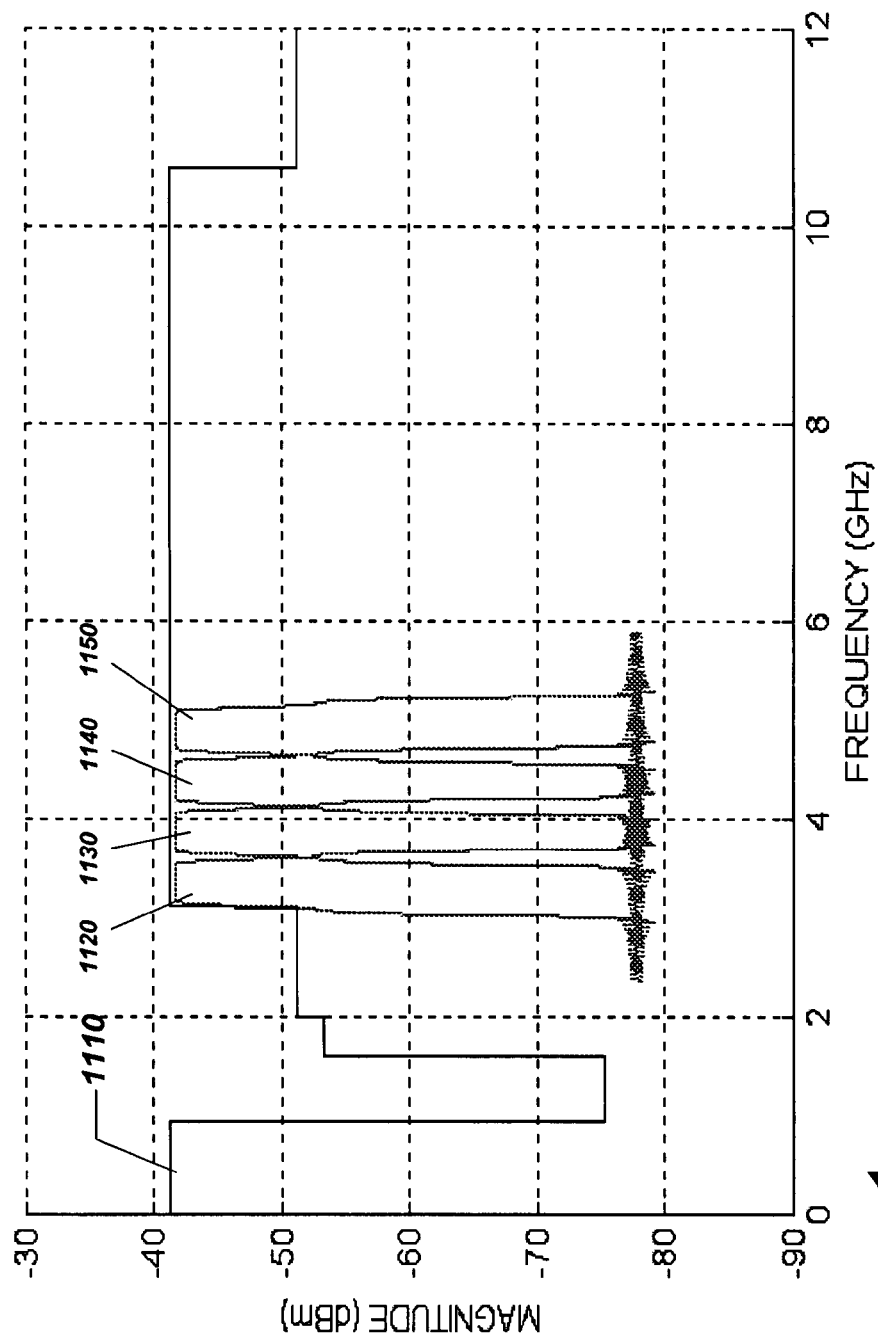
FIG. 11 is a frequency spectrum output of the MIMO-based UWB base station transmitter for the indoor operation according to one embodiment.

FIG. 11 is an output frequency spectrum 1100 of the MIMO-based UWB base station communication transmitter, including four frequency band spectrums of 1120, 1130, 1140 and 1150 according to some embodiments. A FCC emission limitation 1110 for the indoor UWB operation is also shown in FIG. 11. Each transmitter frequency bandwidth of all the frequency band spectrums of 1120, 1130, 1140 and 1150 is 512 MHz and is fitted under the indoor FCC emission limitation 1110 with different carrier frequencies. The detail positions of each frequency band spectrums (dBm) along with the center, lower and upper frequencies (GHz) as well as the channel frequency bandwidth (MHz) are listed in Table 4:

TABLE 4

| Multichannel Label | Center Frequency (GHz) | Lower Frequency (GHz) | Upper Frequency (GHz) | Frequency Bandwidth (MHz) |
|---|---|---|---|---|
| 1120 | 3.357 | 3.101 | 3.613 | 512 |
| 1130 | 3.869 | 3.613 | 4.125 | 512 |
| 1140 | 4.381 | 4.125 | 4.637 | 512 |
| 1150 | 4.893 | 4.637 | 5.149 | 512 |

During the indoor UWB operation, the MIMO-based UWB base station transmitters can avoid interference with wireless local area network (WLAN) 802.11a lower U-NII frequency band in the frequency range of 5.15 GHz to 5.35 GHz since the highest spectrum of the MIMO-based UWB base station transmitter is at 5.149 GHz, which is lower than 5.15 GHz in WLAN 802.11a lower band.

Dual-Mode MIMO-based Receiver of 3G W-CDMA and UWB Portable Station

Figure 12:
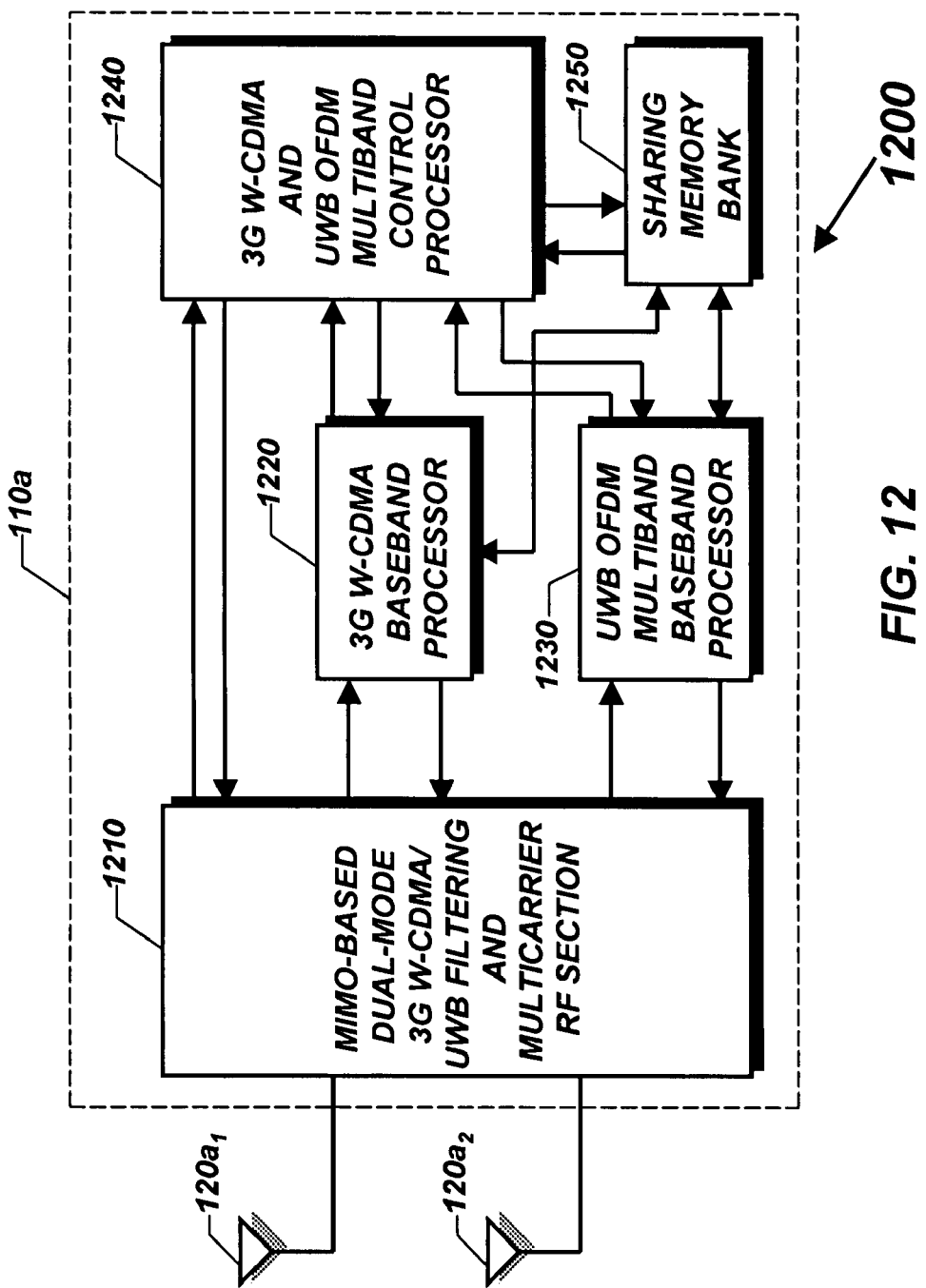
FIG. 12 is a block diagram of a W-CDMA and UWB portable station for a single user according to some embodiments.

FIG. 12 is a block diagram 1200 of a dual-mode MIMO-based receiver of the W-CDMA and UWB portable station 110a according to some embodiments. A dual-mode MIMO-based W-CDMA, UWB filtering and multicarrier RF section 1210 receives RF signals from two antennas of $120a_1$ and $120a_2$ and converts RF signals to either W-CDMA digital signals or UWB digital signals. The dual-mode MIMO-based W-CDMA, UWB filtering and multicarrier RF section 1210 is coupled to a W-CDMA baseband processor 1220 and an UWB OFDM multiband baseband processor 1230. During the W-CDMA mode, the W-CDMA baseband processor 1220 receives the W-CDMA digital signals from the dual-mode MIMO-based W-CDMA, UWB filtering and multicarrier RF section 1210 to perform digital filtering, demultiplexer, rake receiver, dispreading, deinterleaver, and decoding processes. During the UWB mode, the UWB OFDM multiband baseband processor 1230 receives the UWB digital signals from the dual-mode MIMO-based W-CDMA, UWB filtering and multicarrier RF section 1210 to deal with digital filtering, multiband dispreading, time-domain equalizer (TEQ), FFT, frequency-domain equalizer (FEQ), dispreading, deinterleaver, and decoding. A W-CDMA and UWB OFDM multiband control processor 1240 is used to control data flow among blocks of the dual-mode MIMO-based W-CDMA, UWB filtering and multicarrier RF section 1210, the W-CDMA baseband processor 1220, the UWB OFDM multiband baseband processor 1230, and a sharing memory bank 1250.

Figure 13:
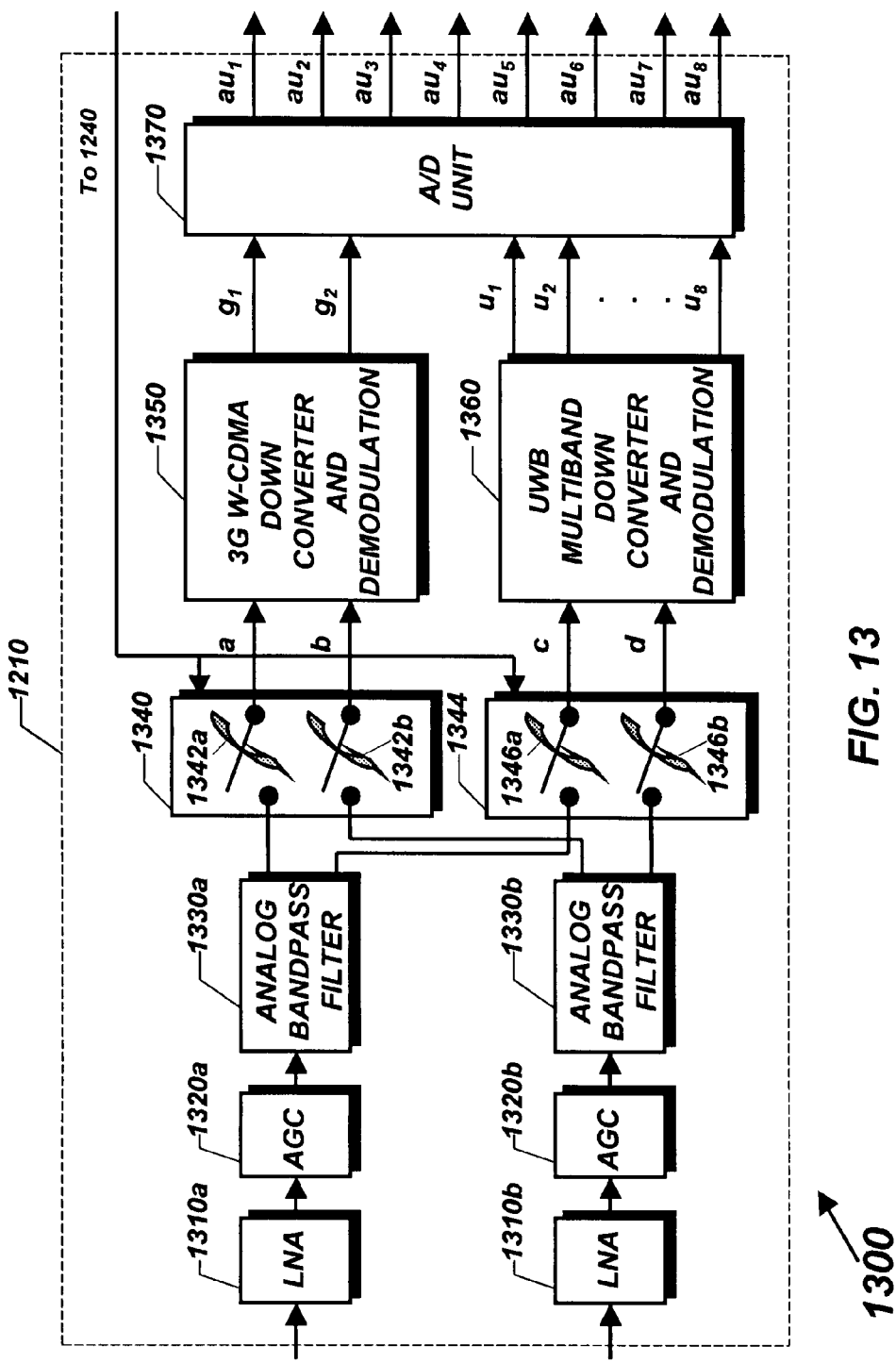
FIG. 13 is a detailed block diagram of a MIMO-based dual-mode 3G W-CDMA and UWB filtering and multicarrier RF section according to some embodiments.

Referring to FIG. 13 is a detailed block diagram 1300 of showing the dual-mode MIMO-based W-CDMA, UWB filtering and multicarrier RF section 1210 according to some embodiments. Two low noise amplifiers (LNA) of 1310a and 1310b receive RF signals from two antennas, respectively, and amplify RF signals. The LNA of 1310a and 1310b respectively connect with two automatic gain controls (AGC) of 1320a and 1320b, followed by two analog baseband filters of 1330a and 1330b. Two outputs of the analog baseband filter 1330a are passed to two switch units of 1340 and 1344. In the same way, two outputs of the analog baseband filter 1330b are passed to the switch units of 1340 and 1344. During the W-CDMA mode, two switches of 1342a and 1342b in the switch unit 1340 connect with the outputs from the analog baseband filters of 1330a and 1330b. The output signals, a and b, of the switch unit 1340 are passed into a W-CDMA down converter and demodulation 1350, which produces two analog baseband signals, $g_1$ and $g_2$, for an A/D unit 1370. During the UWB mode, two switches of 1346a and 1346b in the switch unit 1344 connect with the outputs from the analog baseband filters of 1330a and 1330b. The output signals, c and d, of the switch unit 1344 are passed into an UWB multiband down converter and demodulation 1360 that generates eight analog baseband signals, $u_1, u_2, u_3, u_4, u_5, u_6, u_7,$ and $u_8$, for an A/D unit 1370.

Figure 14:
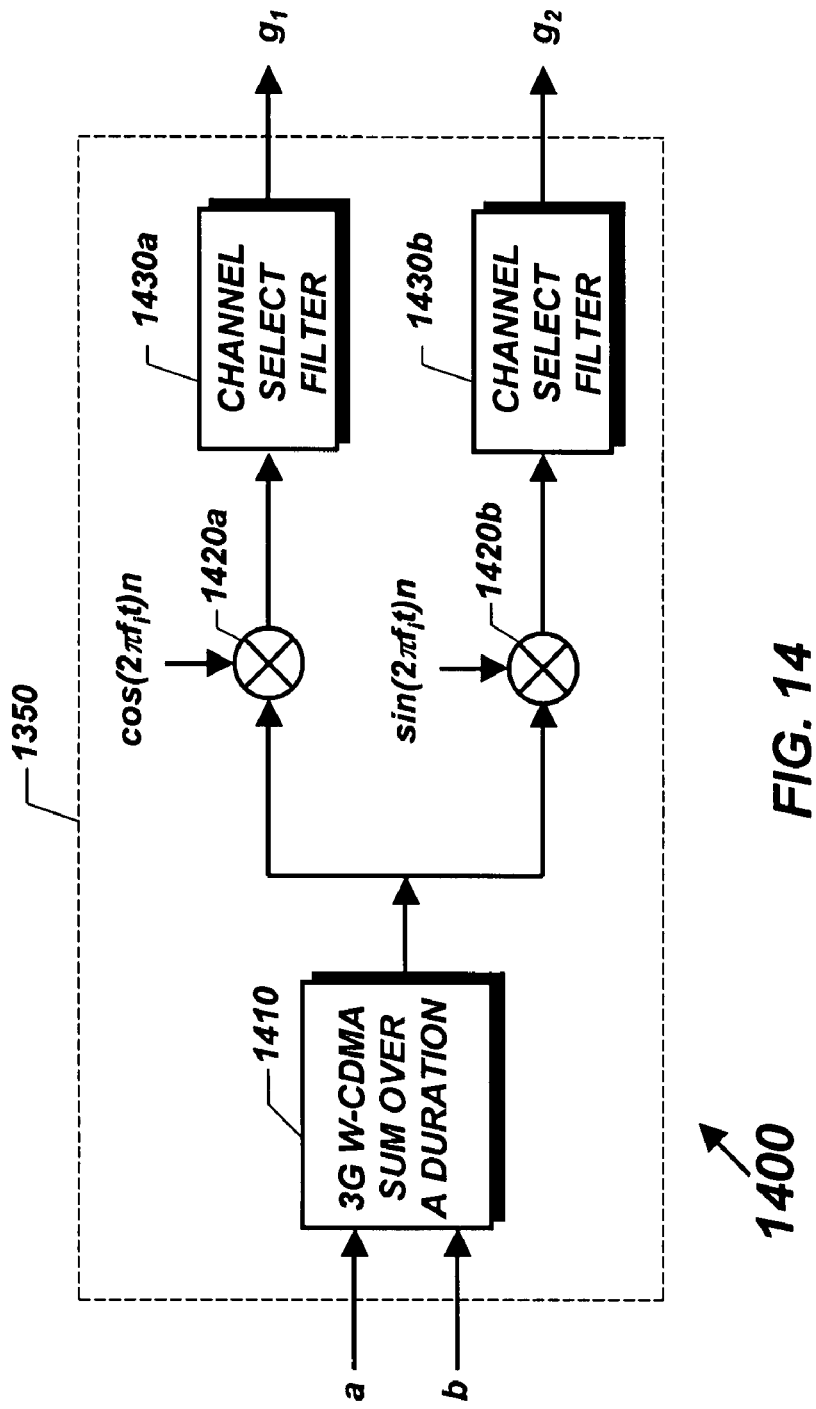
FIG. 14 is a detailed block diagram of a W-CDMA down converter and demodulation according to some embodiments.

Referring to FIG. 14 is a detailed block diagram 1400 of the W-CDMA down converter and demodulation 1350 according to some embodiments. The input signals of a and b are summed together by using a W-CDMA sum over a block duration 1410. The output signals of the W-CDMA sum over the block duration 1410 convert into two parallel signals that are demodulated with the multicarrier of 1420a and 1420b, followed by two channel select filters of 1430a and 1430b to produce desired signals of $g_1$ and $g_2$, respectively.

Figure 15:
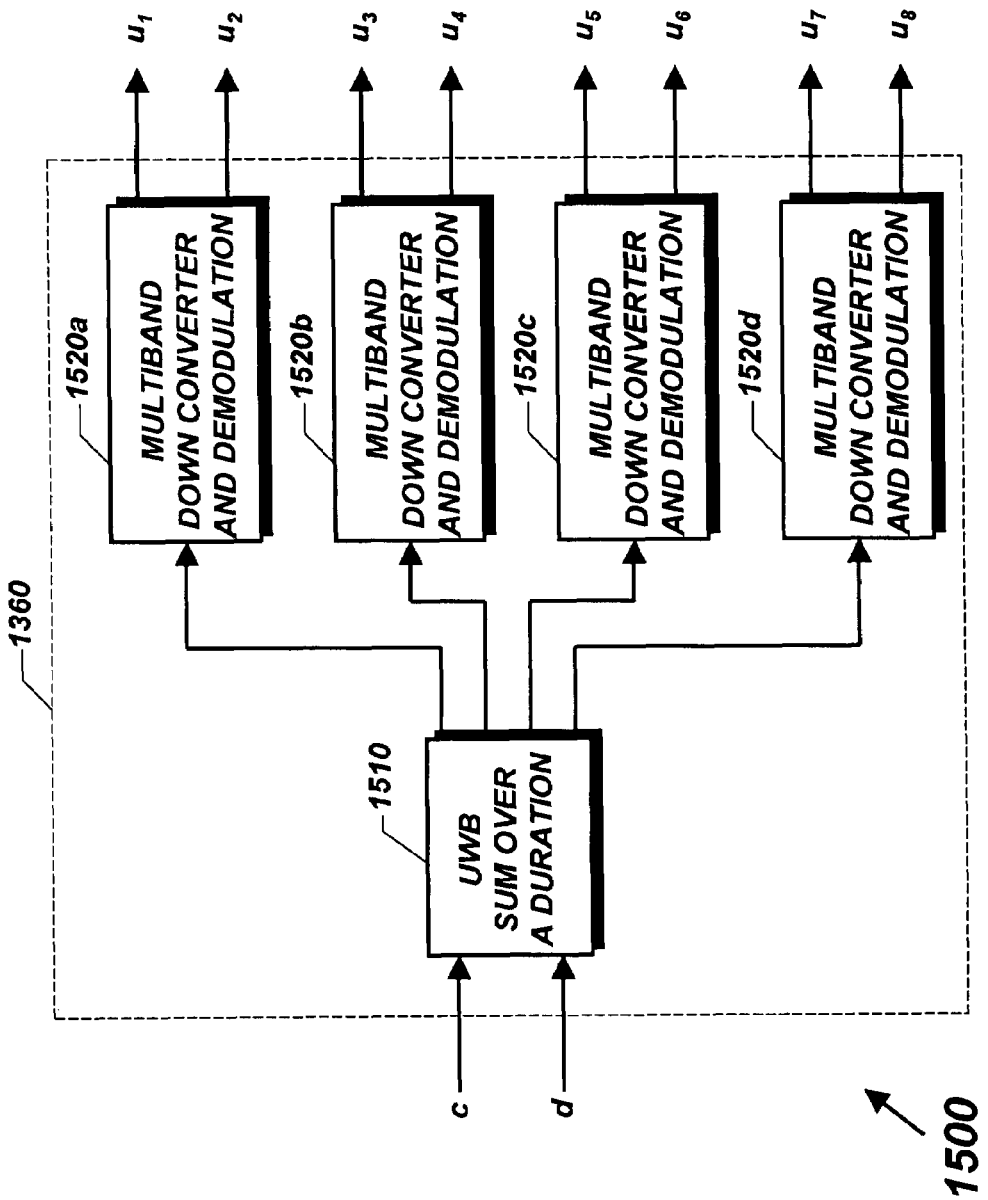
FIG. 15 is a detailed block diagram of an UWB multiband down converter and demodulation according to some embodiments.

Referring to FIG. 15 is a detailed block diagram 1500 of the UWB multiband down converter and demodulation 1360 according to some embodiments. The input signals of c and d are summed together by using an UWB sum over the block duration 1510 to produce four parallel signals for four multiband down converters and demodulations from 1520a to 1520d. The multiband down converters and demodulations from 1520a to 1520d perform down converter and demodulation, and produce eight analog baseband signals from $u_1$ to $u_8$.

Figure 16:
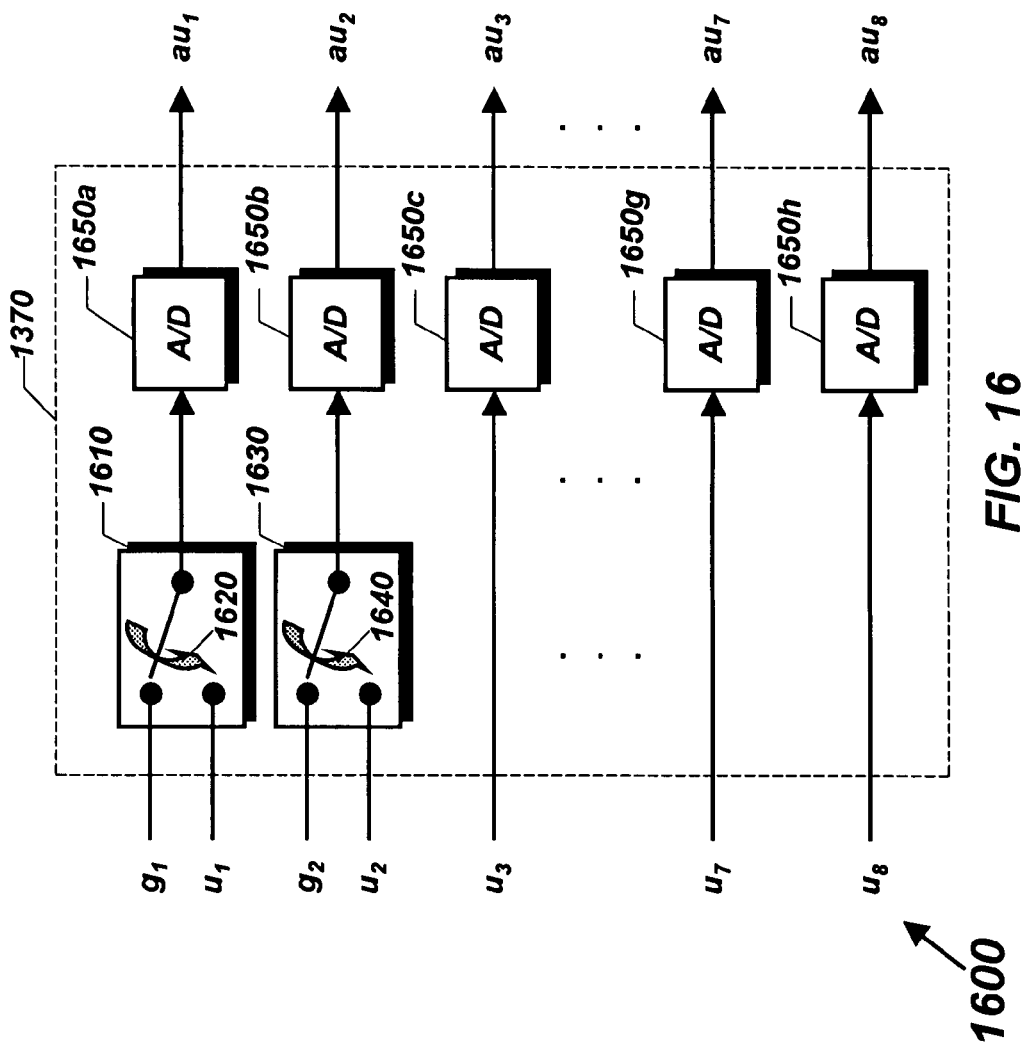
FIG. 16 is a detailed block diagram of an analog-to-digital converter according to some embodiments.

Referring to FIG. 16 is a detailed block diagram 1600 of the A/D unit 1370 according to some embodiments. There are two switch units of 1620 and 1640 and eight A/D converters from 1650a to 1650h, with a sampling rate at 540 MHz. During the W-CDMA mode, two switches of 1620 and 1640 connect to the input signals of $g_1$ and $g_2$, respectively. The outputs of the switches of 1610 and 1630 are passed into two A/D converters of 1650a and 1650b, with the sampling rate at 540 MHz. This is 36 times oversampling for the W-CDMA signals. Other A/D converters from 1650c to 1650h are rest. The output signals $au_1$ and $au_2$ of the A/D converters of 1650a and 1650b will be used in the W-CDMA baseband processor. During the UWB mode, the switches of 1620 and 1640 connect to the input signals of $u_1$ and $u_2$, respectively. The outputs of the switches of 1610 and 1630, and input signals of $u_3$ to $u_8$ are in parallel passed onto eight A/D converters from 1650a to 1650h, where the sampling rate is 540 MHz for all the A/D converters. The output signals of the A/D converters from 1650a to 1650h are referred to as $au_1$ to $au_8$, which will be used in the UWB baseband processor.

Figure 17:
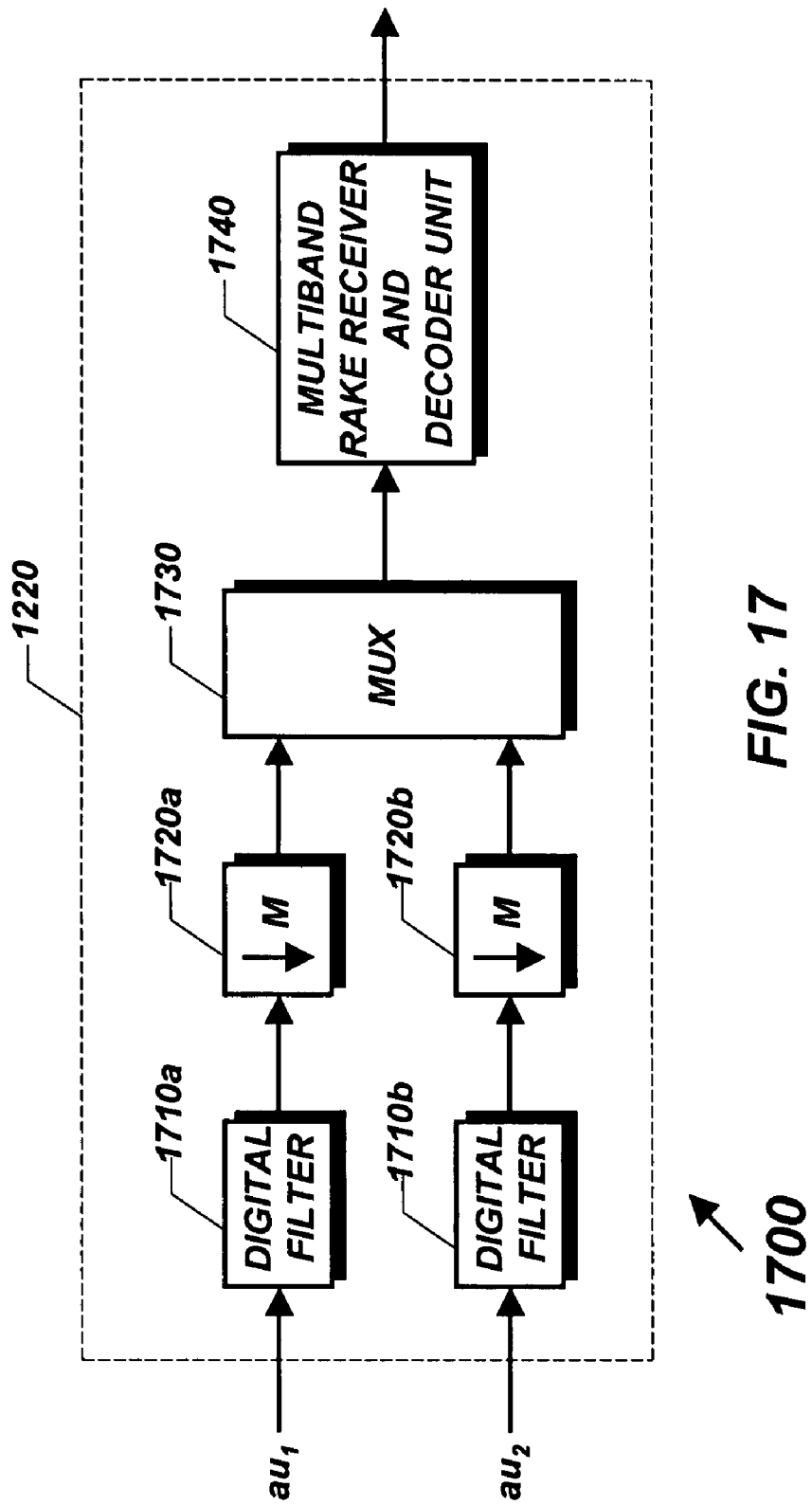
FIG. 17 is a detailed block diagram of a W-CDMA baseband processor in the dual-mode portable station according to some embodiments.

FIG. 17 is a detailed block diagram 1700 of the W-CDMA baseband processor 1220 according to some embodiments. The input signals of $au_1$ and $au_2$ are passed through two digital filters of 1710a and 1710b, followed by two down samplings of 1720a and 1720b, respectively. The output signals of the down samplings of 1720a and 1720b are multiplexed by using a multiplexer (MUX) 1730. Then, the output signal of the MUX 1730 is passed to a multiband rake receiver and decoder unit 1740 to produce a user data stream.

Figure 18:
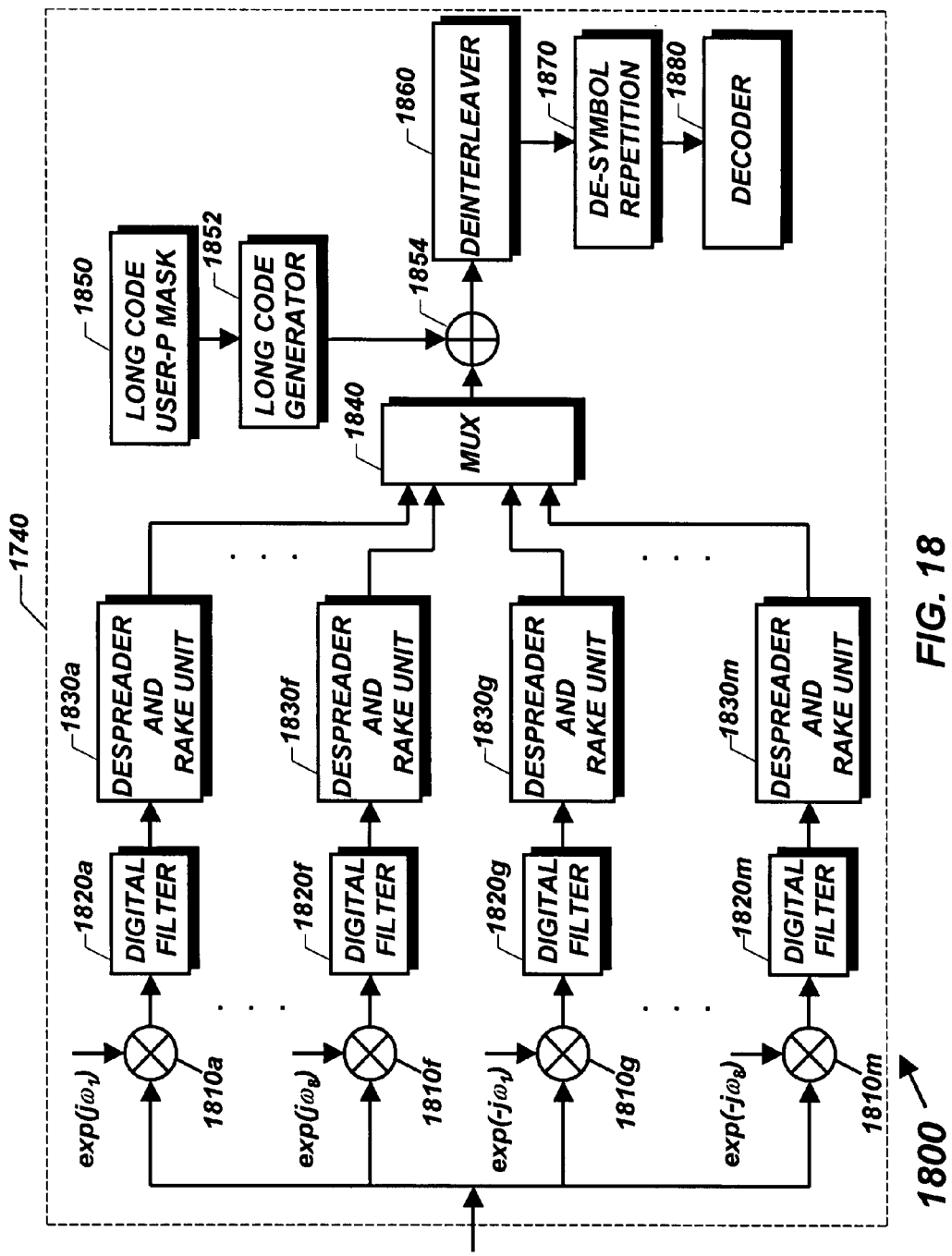
FIG. 18 is a detailed block diagram of a W-CDMA multiband rake receiver and decoder unit according to some embodiments.

Referring to FIG. 18 is a detailed block diagram 1800 of the multiband rake receiver and decoder unit 1740 according to some embodiments. The input signal is digitally demodulated to form 12 multiband baseband signals by using multipliers from 1810a to 1810m. The 12 multiband baseband signals are passed through 12 digital filters from 1820a to 1820m to produce the desired signals, followed by using 12 despreader and rake units from 1830a to 1830m. Then 12 parallel output signals of the despreader and rake units from 1830a to 1830m are multiplexed together by a MUX 1840 to produce a serial signal. The serial signal is thus despread by using a long code sequence that is generated by using a long code generator 1852 based on a long code users mask 1850. The output signal of the despreader 1854 is deinterleaved by using a deinterleaver 1860, followed by using a desymbol repetition 1870 and a decoder 1880 to produce the users data stream.

Figure 19:
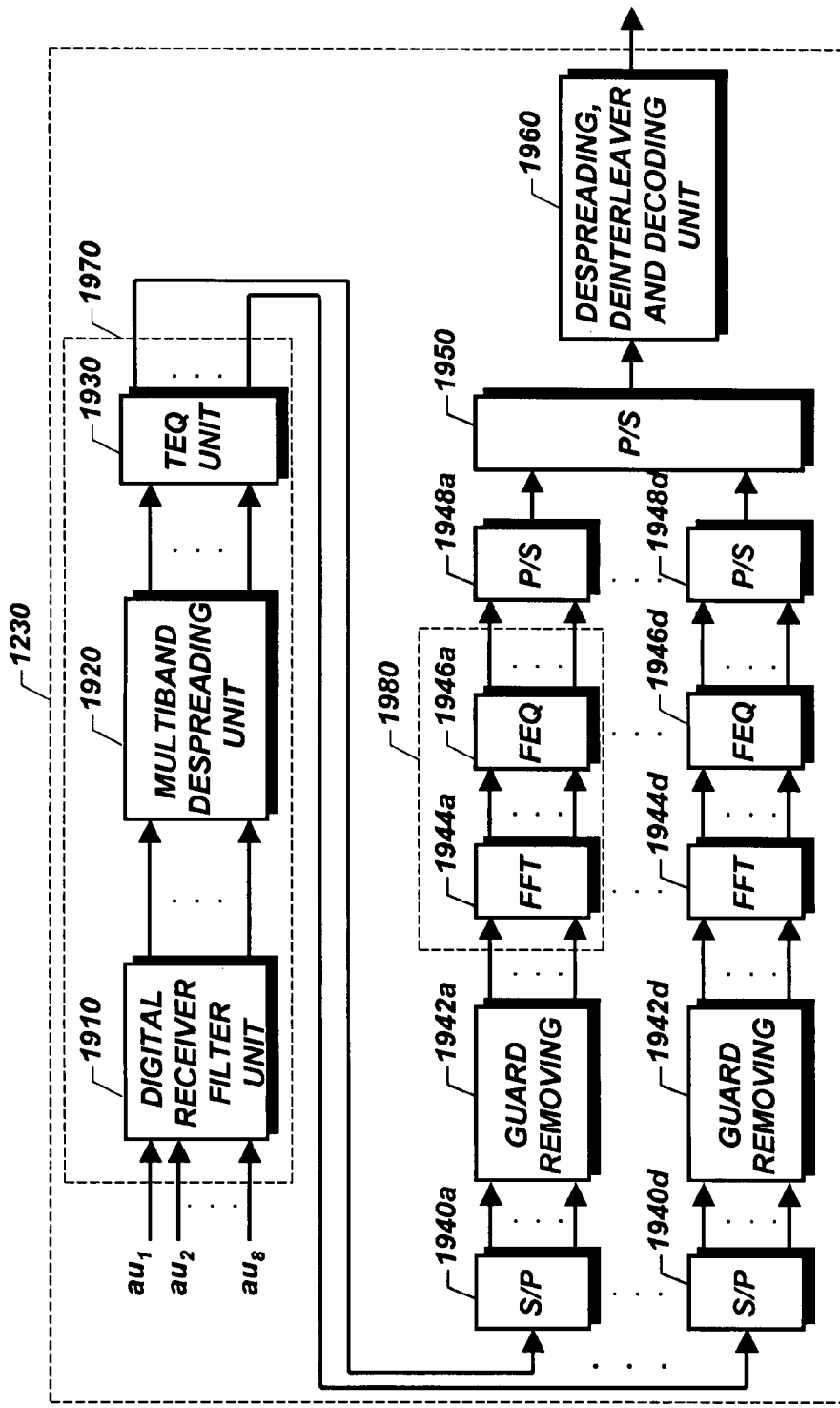
FIG. 19 is a detailed block diagram of a UWB OFDM multiband baseband processor according to some embodiments.

FIG. 19 is a detailed block diagram 1900 of the UWB OFDM multiband baseband processor 1230 according to some embodiments. The eight input signals from $au_1$ to $au_8$ are passed through a digital receiver filter unit 1910, followed by a multiband dispreading unit 1920 and a TEQ unit 1930 to produce four parallel signals. The TEQ unit 1930 is used to reduce the length of cyclic prefix to a more manageable number without reducing performance significantly. In other words, the TEQ unit 1930 can produce a new target channel with a much smaller effective constraint length when concatenated with the channel. Thus, the outputs of the TEQ unit 1930 in parallel are passed through four S/Ps from 1940a to 1940d to produce parallel digital sequences. Each of the S/Ps from 1940a to 1940d produces 1280 parallel digital sequences for each of guard removing units from 1942a to 1942d. The guard removing units from 1942a to 1942d remove 256 samples from the 1280 parallel digital sequences of the S/Ps of 1940a to 1940d to produce 1024 parallel digital sequences, which are used as inputs for FFT units from 1944a to 1944d. Each of the FFT units from 1944a to 1944d produces 512 frequency-domain signals that are used for frequency-domain equalizer (FEQ) units from 1946a to 1946d. The FEQ units from 1946a to 1946d are used to compensate for phase distortions, which are a result of phase offsets between the sampling clocks in the transmitter and the receiver of the MIMO-based multiband of the UWB communication transceiver. This is because the phases of the received outputs of the multiband FFT units from 1944a to 1944d are unlikely to be exactly the same as the phases of the transmitter symbols at the input to the IFFT units from 852a to 852d of the MIMO-based multiband of UWB base station transmitter as shown in FIG. 8. Thus, the outputs of the FEQ units from 1946a to 1946d are passed through a set of P/S units from 1948a to 1948d and a P/S 1950 to produce a serial sequence for all of the four frequency bands. Thus, the output sequence of the P/S 1950 is used for a despreading, deinterleaver, and decoding unit 1960, which performs despreading, deinterleaving, and decoding for the MIMO-based multiband of the UWB mobile communication receiver.

Figure 20:
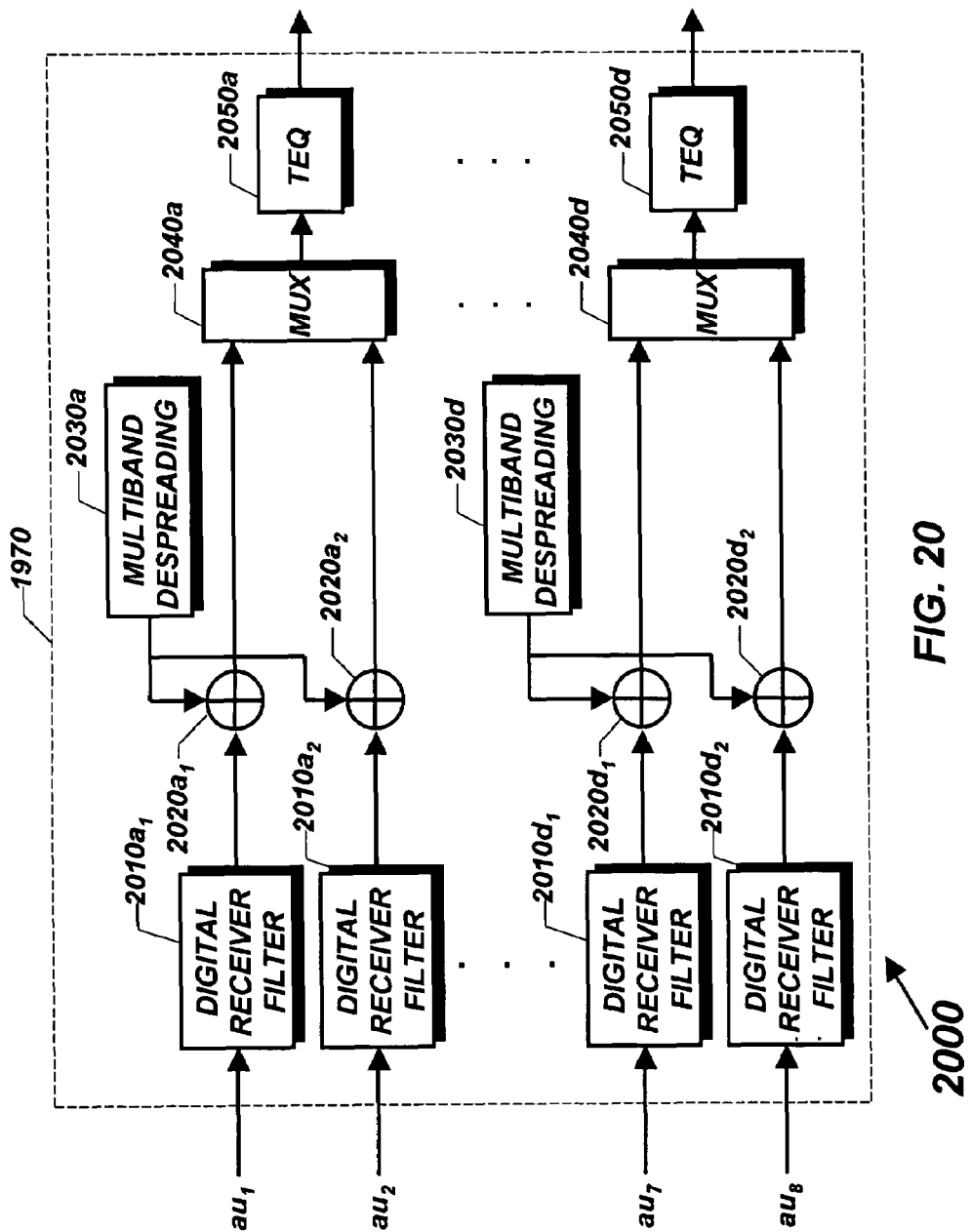
FIG. 20 is a detailed block diagram of a combination section of a digital receiver filter unit, a multiband despreading unit, and a time-domain equalizer (TEQ) unit according to some embodiments.

Referring to FIG. 20 is a detailed block diagram 2000 of a combination 1970 of the digital receiver filter unit 1910, the multiband dispreading unit 1920, and the TEQ unit 1930 according to some embodiments. The eight input signals from $au_1$ to $au_8$ are in parallel passed through the digital receiver filters from 2010$a_1$ and 2010$a_2$ to 2010$d_1$ and 2010$d_2$, respectively. The output signals of the digital receiver filters from 2010$a_1$ and 2010$a_2$ to 2010$d_1$ and 2010$d_2$ are despread by using XORs from 2020$a_1$ and 2020$a_2$ to 2020$d_1$ and 2020$d_2$ with the output sequences of multiband dispreading from 2030a to 2030d. Then, every pair of the output signals of the XOR from 2020$a_1$ and 2020$a_2$ to 2020$d_1$ and 2020$d_2$ are multiplexed together by using MUXs from 2040a to 2040d, followed by using TEQ from 2050a to 2050d.

Figure 21:
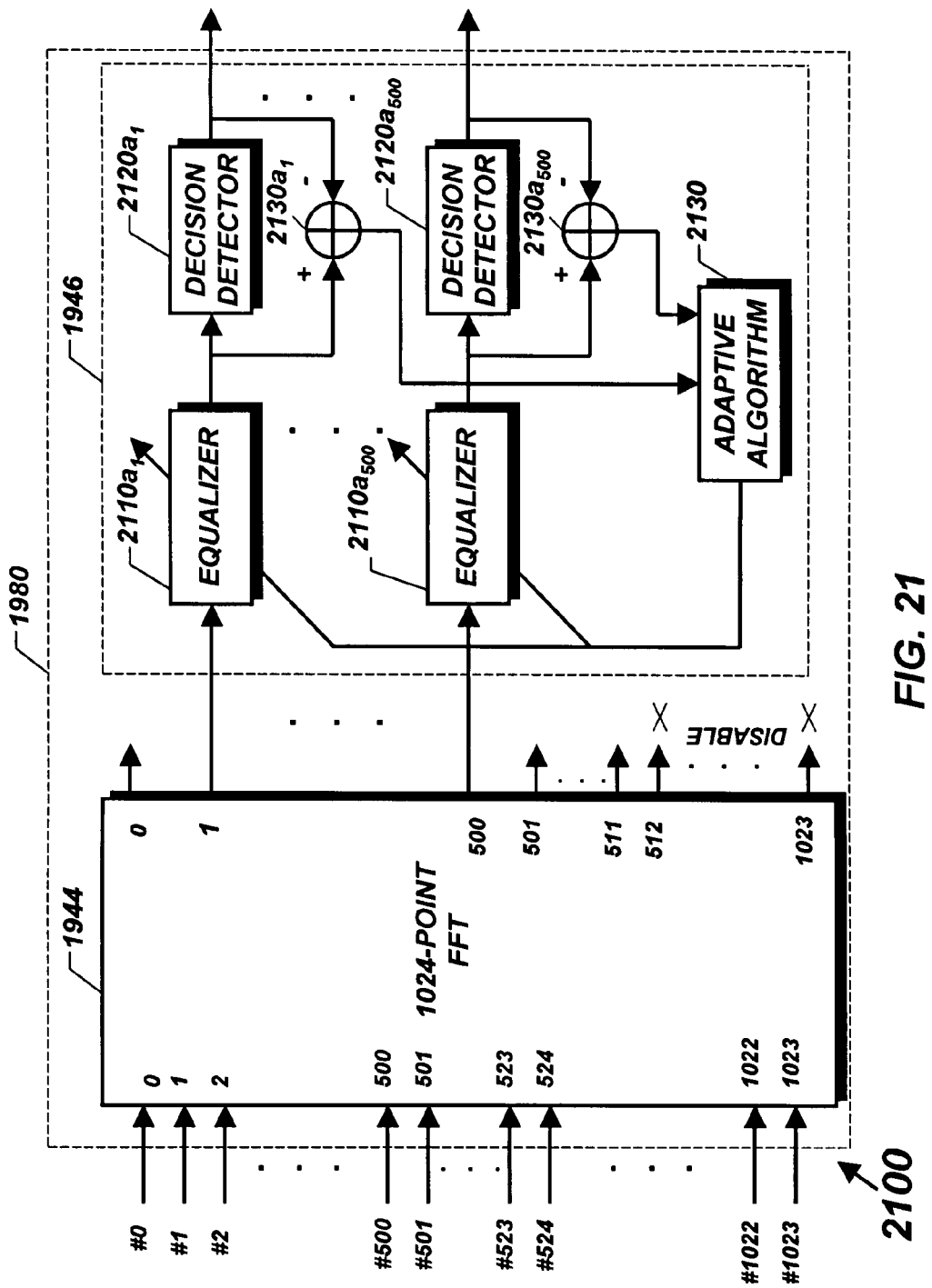
FIG. 21 is a detailed block diagram of a combination section of a fast Fourier transform (FFT) unit and a frequency-domain equalizer (FEQ) unit according to some embodiments.

FIG. 21 is a detailed block diagram 2100 of a combination 1980 including the FFT 1944 and the FEQ 1946 according to some embodiments. The FFT 1944 has a 1024-point input of real-value and produces a 512-point complex data labeled from 0 to 511, while a 512-point complex data with labels of labeled from 511 to 1023 is disable. The FFT 1944 labeled from 0 to 511 also contains 12 Nulls. So, the FFT 1944 produces a 500-point complex data for the FEQ 1946. The FEQ 1946 contains 500 equalizers from $2110a_1$ to $2110a_{500}$ decision detectors from $2120a_1$ to $2120a_{500}$, and 500 subtractions from $2130a_1$ to $2130a_{500}$ that operate in parallel. Each of the equalizers from $2110a_1$ to $2110a_{500}$ has N-tap with adaptive capability. Each of the decision detectors from $2120a_1$ to $2120a_{500}$ is a multi-level threshold decision. Each of the subtractions from $2130a_1$ to $2130a_{500}$ performs subtracting between the output of each of the equalizers from $2110a_1$ to $2110a_{500}$ and the output of each of the decision detectors from $2120a_1$ to $2120a_{500}$. The output of each of the subtraction from $2130a_1$ to $2130a_{500}$ is referred to an error signal, which is used to adjust the N-tap coefficients of the each of the equalizers from $2110a_1$ to $2110a_{500}$ by using an adaptive algorithm 2130.

The phases of the received outputs of the FFT 1944 do not have exactly the same as the phases of the transmitter symbols at the input to the IFFT units from 852a to 852d of the MIMO-based multiband of UWB base station transmitter as shown in FIG. 8. In addition, the phase responses have to consider the channel in which is coped with the TEQ 1930 as shown in FIG. 19. Thus, the FEQ 1946 in FIG. 21 is used to compensate for the phase distortion that is a result of a phase offset between the sampling clocks in the transmitter and the receiver of the MIMO-based multiband of the UWB communication transceiver. The FEQ 1946 also offers the additional benefit of received signal scaling before decoding since the FEQ 1946 can be used to adjust the gain of the FFT 1944 output so that the decision detectors from $2120a_1$ to $2120a_{500}$ can be set the same parameters for all subchannels regardless of the different subchannel attenuations.

Figure 22:
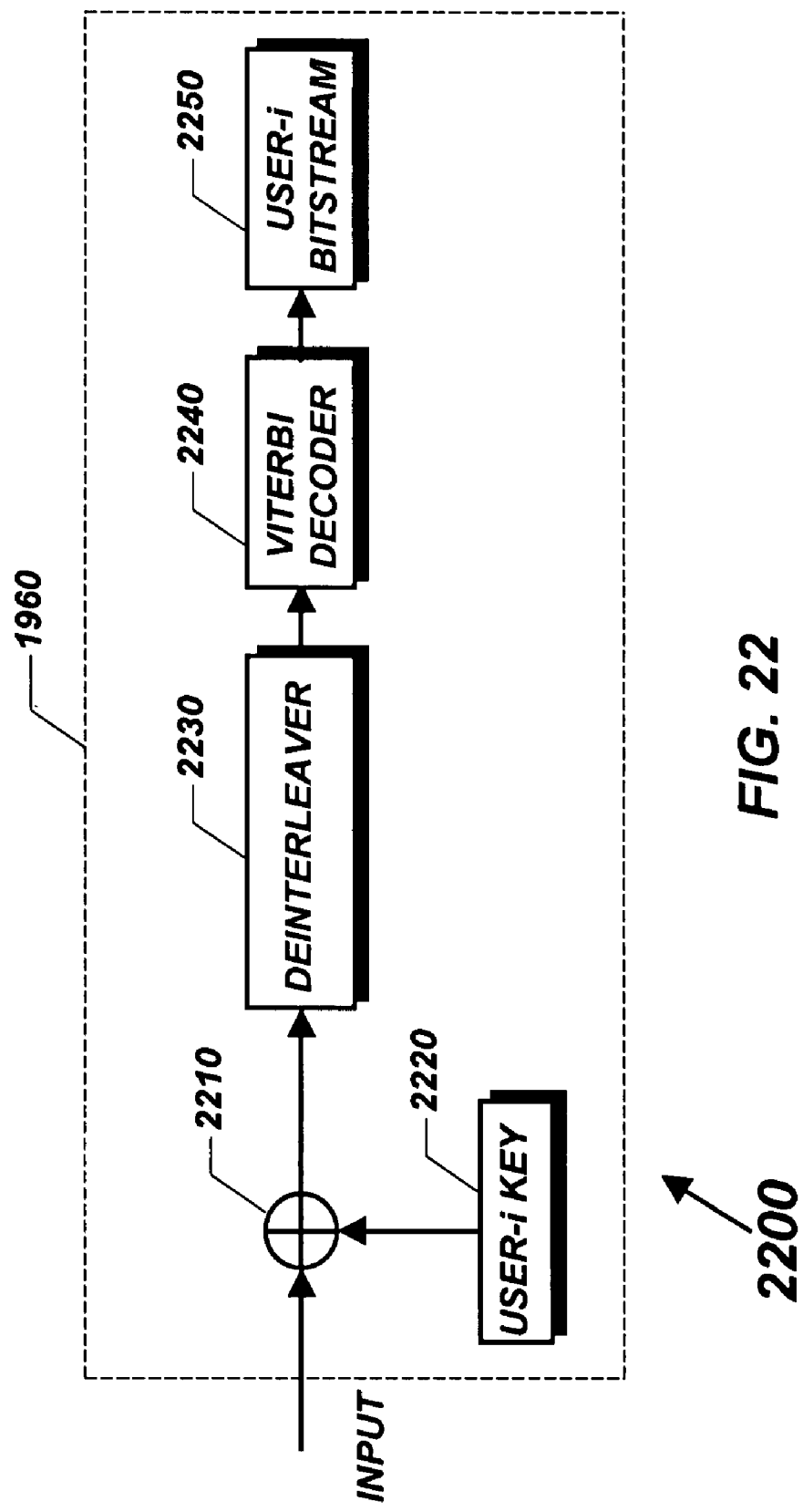
FIG. 22 is a detailed block diagram of a despreading, deinterleaver, and decoding unit according to some embodiments.

FIG. 22 is a detailed block diagram 2200 of the despreading, deinterleaver, and decoding unit 1960 according to some embodiments. This unit 1960 includes a despreading 2210, a user-1 key 2220, a deinterleaver 2230, a Viterbi decoding 2240, and a user-1 bitstream 2250. The input signal is despread with a spreading sequence of the user-1 key 2220, which provides a unique key sequence, by using the despreading 2210. The despreading 2210 is a XOR operation to produce an encoded user-1 data bitstream. This encoded user-1 data bitstream is then deinterleaved by using the deinterleaver 2230 that is also coupled to the Viterbi decoding 2240. The Viterbi decoding 2240 decodes the encoded user-1 data bitstream to produce an original transmitted user-1 data bitstream that is stored into the user-1 bitstream 2250.

While the present invention has been described with respect to a limited number of embodiments, those skilled in the art will appreciate numerous modifications and variations therefrom. The following claims cover all such modifications and variations as fall within the true spirit and scope of the present invention.

What is claimed is:

1. A multiband MIMO-based dual-mode portable communication system has P Wideband Code Division Multiple Access (W-CDMA) and Ultra Wideband (UWB) portable stations having N antennas, a Multiple-Input Multiple-Output (MIMO)-based UWB base station having M antennas, a MIMO-based W-CDMA base station having Q antennas, an UWB multiband, a W-CDMA frequency band, and MIMO channels, where M, N, P, Q, and R are integers and greater than 1, the communication system further comprising:

said MIMO-based W-CDMA base station including a W-CDMA baseband processor unit coupled to a MIMO-based W-CDMA filtering and multicarrier radio frequency (RF) unit that is connected to a W-CDMA control processor unit, which is connected with the W-CDMA baseband processor unit;

said MIMO-based W-CDMA filtering and multicarrier RF unit coupled to the Q antennas;

said W-CDMA baseband processor unit further including two digital filters, two down samplings, a MUX, and a multiband rake receiver and decoder unit;

said MIMO-based UWB base station including an UWB baseband processor unit coupled to a MIMO-based UWB spreading and filtering unit followed by a MIMO-based modulation multicarrier unit that is connected to an UWB control processor unit, which is also connected with the UWB baseband processor unit and the MIMO-based spreading and filtering unit;

said MIMO-based modulation multicarrier unit coupled to the M antennas;

each of said P W-CDMA and UWB portable stations including a MIMO-based dual-mode W-CDMA and UWB filtering and multicarrier unit, a W-CDMA mobile baseband processor unit, an UWB OFDM multiband baseband processor unit, a W-CDMA and UWB OFDM multiband control processor unit, and a sharing memory bank unit;

said MIMO-based dual-mode W-CDMA and UWB filtering and multicarrier unit further including two low noise amplifiers followed by two automatic gain controllers coupled to two analog bandpass filters connected to two dual-switch units, one of said two dual-switch units coupled to a W-CDMA down converter and demodulation and another of said two dual-switch units coupled to an UWB multiband down converter and demodulation, and both of said W-CDMA down converter and demodulation and said UWB multiband down converter and demodulation coupled to an analog-to-digital (A/D) converter unit;

said A/D converter unit having two switch units that are controllable, each of the two switch units having two inputs and one output, and 8 A/D converters; and said MIMO-based dual-mode W-CDMA and UWB filtering and multicarrier unit coupled to the N antennas.

2. The multiband MIMO-based dual-mode portable communication system of claim 1 wherein each of said two dual-switch units having two internal switches is controlled by said W-CDMA and UWB OFDM multiband control processor unit to provide information from the two analog bandpass filters either to the W-CDMA down converter and demodulation or to the UWB multiband down converter and demodulation.

3. The multiband MIMO-based dual-mode portable communication system of claim 2 wherein said one of the two dual-switch units coupled to the W-CDMA down converter and demodulation is used during a W-CDMA operation or said another of the two dual-switch units coupled to the UWB multiband down converter and demodulation is used during an UWB operation.

4. The multiband MIMO-based dual-mode portable communication system of claim 1 wherein said UWB multiband has four UWB frequency bands within a frequency range from greater than 3.1 GHz to less than 5.15 GHz, each of the four UWB frequency bands having approximate 512 MHz with a magnitude below −41.3 dBm.

5. The multiband MIMO-based dual-mode portable communication system of claim 4 wherein said P W-CDMA and UWB portable stations uses any one of said four UWB frequency bands or any combination of said four UWB frequency bands during the UWB operation.

6. The multiband MIMO-based dual-mode portable communication system of claim 1 wherein said eight A/D converters has the same sampling rate and bit resolution, two of the eight A/D converters coupled to the two switch units that are controllable.

7. The multiband MIMO-based dual-mode portable communication system of claim 6 wherein said two switch units connect either two W-CDMA input signals or two UWB input signals.

8. The multiband MIMO-based dual-mode portable communication system of claim 6 wherein said only two of the eight A/D converters operate in parallel during a W-CDMA receiver mode.

9. The multiband MIMO-based dual-mode portable communication system of claim 7 wherein said eight A/D converters operate in parallel and said two switch units that are coupled to two of the eight A/D converters connect to the two UWB input signals during an UWB receiver mode.

10. The multiband MIMO-based dual-mode portable communication system of claim 1 wherein said multiband rake receiver and decoder unit further includes twelve complex modulations, twelve digital filters, twelve despreaders and rake units, a MUX, a long code user-p mask, a long code generator, a XOR, a deinterleaver, a desymbol repetition, and a decoder.

11. The multiband MIMO-based dual-mode portable communication system of claim 1 wherein said UWB OFDM multiband baseband processor unit further includes a combination section of a digital receiver filter unit, a multiband dispreading unit, and a time-domain equalizer (TEQ) unit, four serial-to-parallel (S/P), four guard removing, four combinations of fast Fourier transform (FFT) and frequency-domain equalizer (FEQ), five parallel-to-serial (P/S), and a dispreading, deinterleaver and decoding unit.

12. The multiband MIMO-based dual-mode portable communication system of claim 11 wherein said combination section of the digital receiver filter unit, the multiband dispreading unit, and the TEQ unit further contains eight digital receiver filters, eight-XOR, four-multiband-despreading, four-MUX, and four-TEQ.

13. The multiband MIMO-based dual-mode portable communication system of claim 11 wherein each of the four combinations of the FFT and the FEQ further includes a FFT having 1024 inputs, 512 outputs and 512 disable outputs, 500 of the 512 outputs are connected to 500 N-tap equalizers followed by 500 decision detector units, and an adaptive algorithm, which is used to update the 500 N-tap equalizers.

14. A dual-mode Wideband Code Division Multiple Access (W-CDMA) and Ultra-Wideband (UWB) communication receiver comprising:

two antennas coupled to a Multiple-Input-Multiple-Output (MIMO)-based dual-mode W-CDMA and UWB filtering and multicarrier radio frequency (RF) section;

the MIMO-based dual-mode W-CDMA and UWB filtering and multicarrier RF section are connected to a W-CDMA baseband processor, an UWB OFDM multiband baseband processor, and a W-CDMA and UWB Orthogonal Frequency Division Multiplexing (OFDM) multiband control processor;

the W-CDMA and UWB OFDM multiband control processor coupled to the W-CDMA baseband processor, the UWB OFDM multiband baseband processor, and a sharing memory bank;

the sharing memory bank also coupled to the W-CDMA baseband processor, and the UWB OFDM multiband baseband processor;

the UWB OFDM multiband baseband processor using an UWB multiband;

the UWB multiband having four frequency bands within the frequency range from greater than 3.1 GHz to less than 5.15 GHz and a magnitude below −41.3 dBm;

the MIMO-based dual-mode W-CDMA and UWB filtering and multicarrier RF section further including two low noise amplifiers, two automatic gain controllers, two analog bandpass filters, two dual-switch units, a W-CDMA down converter and demodulation, an UWB multiband down converter and demodulation, and an analog-to-digital (A/D) converter unit; and the A/D converter unit having the same type of eight A/D converters that can operate at a sampling rate of 540 MHz.

15. The dual-mode W-CDMA and UWB communication receiver of claim 14 wherein said UWB OFDM multiband baseband processor deals with four UWB-OFDM frequency bands, with each frequency band having 512 MHz approximately.

16. The dual-mode W-CDMA and UWB communication receiver of claim 14 wherein only two among the eight A/D converters are operated producing an oversampling rate of 36 times for W-CDMA input signals.

17. The dual-mode W-CDMA and UWB communication receiver of claim 14 wherein eight A/D converters are operated in parallel for UWB input signals, each A/D converter having a 540-MHz sampling rate.

* * * * *